(12) United States Patent
Turba et al.

(10) Patent No.: US 7,191,167 B1
(45) Date of Patent: Mar. 13, 2007

(54) STEP TO SAVE CURRENT TABLE FOR LATER USE

(75) Inventors: Thomas N. Turba, Roseville, MN (US); J. Mark Brassil, Anoka, MN (US); Kenneth L. Reising, West St. Paul, MN (US)

(73) Assignee: Unisys Corporation, Blue Bell, PA (US)

( * ) Notice: Subject to any disclaimer, the term of this patent is extended or adjusted under 35 U.S.C. 154(b) by 522 days.

(21) Appl. No.: 10/027,178

(22) Filed: Dec. 21, 2001

(51) Int. Cl.
*G06F 7/00* (2006.01)
*G06F 17/00* (2006.01)

(52) U.S. Cl. .................. 707/2; 707/102; 707/10; 707/101; 707/100

(58) Field of Classification Search .............. 707/1–10, 707/100–104, 101, 102, 200–104.1; 709/223, 709/206, 217–219, 203, 246
See application file for complete search history.

(56) References Cited

U.S. PATENT DOCUMENTS

| | | | | |
|---|---|---|---|---|
| 5,729,734 A * | 3/1998 | Parker et al. ................. 707/9 |
| 5,802,518 A * | 9/1998 | Karaev et al. ................ 707/9 |
| 5,892,909 A * | 4/1999 | Grasso et al. ............... 709/203 |
| 6,032,184 A * | 2/2000 | Cogger et al. .............. 707/10 |
| 6,052,685 A * | 4/2000 | Eastwick et al. ............ 707/10 |
| 6,134,549 A * | 10/2000 | Regnier et al. ............... 707/9 |
| 6,185,567 B1 * | 2/2001 | Ratnaraj et al. ............. 707/10 |
| 6,226,649 B1 * | 5/2001 | Bodamer et al. ........ 707/104.1 |
| 6,240,417 B1 * | 5/2001 | Eastwick et al. ............ 707/10 |
| 6,366,934 B1 * | 4/2002 | Cheng et al. ............... 715/513 |
| 6,430,624 B1 * | 8/2002 | Jamtgaard et al. .......... 709/246 |
| 6,480,860 B1 * | 11/2002 | Monday .................... 707/102 |
| 6,502,101 B1 * | 12/2002 | Verprauskus et al. ....... 707/101 |
| 6,523,036 B1 * | 2/2003 | Hickman et al. ............. 707/10 |
| 6,604,100 B1 * | 8/2003 | Fernandez et al. ............ 707/3 |
| 6,606,596 B1 * | 8/2003 | Zirngibl et al. ............ 345/752 |
| 6,643,633 B2 * | 11/2003 | Chau et al. .................... 707/1 |
| 6,643,650 B1 * | 11/2003 | Slaughter et al. ........ 707/104.1 |
| 6,681,370 B2 * | 1/2004 | Gounares et al. ........... 707/201 |
| 6,704,736 B1 * | 3/2004 | Rys et al. ................... 707/100 |
| 6,708,173 B1 * | 3/2004 | Behr et al. .................. 707/10 |
| 6,721,722 B1 * | 4/2004 | Turba ........................... 707/2 |
| 6,728,750 B1 * | 4/2004 | Anderson et al. .......... 707/102 |
| 6,763,343 B1 * | 7/2004 | Brooke et al. ................. 707/1 |

(Continued)

OTHER PUBLICATIONS

Karlapalem et al. "HODFA: An Architectureal Framework for Homogenizing Heterogeneous Legacy Databases"—SIGMOND RECORD, vol. 24, No. 1, Mar. 1995 ACM (pp. 15-20).*

(Continued)

*Primary Examiner*—John E. Breene
*Assistant Examiner*—Anh Ly
(74) *Attorney, Agent, or Firm*—Charles A. Johnson; Mark T. Starr; Nawrocki, Rooney & Sivertson, P.A.

(57) ABSTRACT

An apparatus for and method of temporarily, or permanently, saving the current computational data as a table within a legacy data base management system for later use within the current computational service or for use in a following computational service. In particular, the apparatus enables the generation of XML output documents with computational data from more than one source. The DTD, IDT, and other key conversion components may be stored within a repository of the legacy data base management system.

25 Claims, 34 Drawing Sheets

U.S. PATENT DOCUMENTS

| | | | |
|---|---|---|---|
| 6,810,429 B1* | 10/2004 | Walsh et al. | 709/246 |
| 6,832,237 B1* | 12/2004 | Christensen et al. | 709/200 |
| 6,892,228 B1* | 5/2005 | Penders | 709/219 |
| 6,915,485 B1* | 7/2005 | Lambrecht et al. | 715/734 |
| 7,013,306 B1* | 3/2006 | Turba et al. | 717/101 |
| 7,031,963 B1* | 4/2006 | Bae | 707/10 |
| 7,089,255 B1* | 8/2006 | Turba | 707/102 |
| 7,099,868 B1* | 8/2006 | Turba et al. | 707/10 |
| 7,099,877 B1* | 8/2006 | Turba et al. | 707/100 |
| 2001/0034679 A1* | 10/2001 | Wrigley | 705/35 |
| 2002/0035584 A1* | 3/2002 | Scheier et al. | 707/517 |
| 2002/0091702 A1* | 7/2002 | Mullins | 707/100 |
| 2003/0023580 A1* | 1/2003 | Braud et al. | 707/3 |
| 2003/0033317 A1* | 2/2003 | Ziglin | 707/102 |
| 2003/0069758 A1* | 4/2003 | Anderson et al. | 705/3 |
| 2003/0088421 A1* | 5/2003 | Maes et al. | 704/270.1 |
| 2003/0158839 A1* | 8/2003 | Faybishenko et al. | 707/3 |
| 2004/0133551 A1* | 7/2004 | Linstedt | 707/1 |
| 2005/0262157 A1* | 11/2005 | Vanyo et al. | 707/200 |
| 2005/0262169 A1* | 11/2005 | Christensen et al. | 707/204 |

OTHER PUBLICATIONS

Candan et al. "Enabling Dynamic Content Caching for Database-Driven Web Sites" ACM SIGMOND 2001 May 21-24 (pp. 532-543).*

* cited by examiner

HKLM\SOFTWARE\UNISYS\UTRACE  ⟵ 565

APPNAME -- Subkey matching the name of the application

| ENABLETRACE | -- | DWORD value indication a Boolean (1=trace., 0=no trace). |
| MAXENTRIES | -- | DWORD value indicating the maximum number of entries in the trace file. If missing, then no upper limit is imposed. |
| FORMATFLAGS | -- | DWORD value indicating message formatting flags. |
| POLICYFLAGS | -- | DWORD value indicating trace policy flags set for the application. |
| TRACELEVEL | -- | DWORD value indicating a trace level. 0 = no trace. |
| TRACEPATH | -- | String value indicating the directory path for the trace files. |
| REGTRACE | -- | A string value containing the HKLM\Software sub key to trace for this application. Blank or missing for no registry trace. |
| COMPONENT | -- | A subkey for a specific component of the application. |

POLICYFLAGS -- Value indicating component level trace policy flags
  TRACELEVEL -- DWORD Value indicating a trace level. 0 = no trace.
  VERSIONTRACE -- String value specifying executable component name for version information tracing.

FIG. 18

```
#define Cl_TRACE_VERSION      0x1
#define Cl_TRACE_ERROR        0x2
#define Cl_TRACE_INTERFACE    0x4
#define Cl_TRACE_FLOW         0x8
#define Cl_TRACE_DETAIL       0x10
```

FIG. 20A

```
if (m_trace.Active(C)_TRACE_DETAIL))
    m_trace<<"MY Detailed Trace information"<<Localvariable<<traceit
```

FIG. 20B

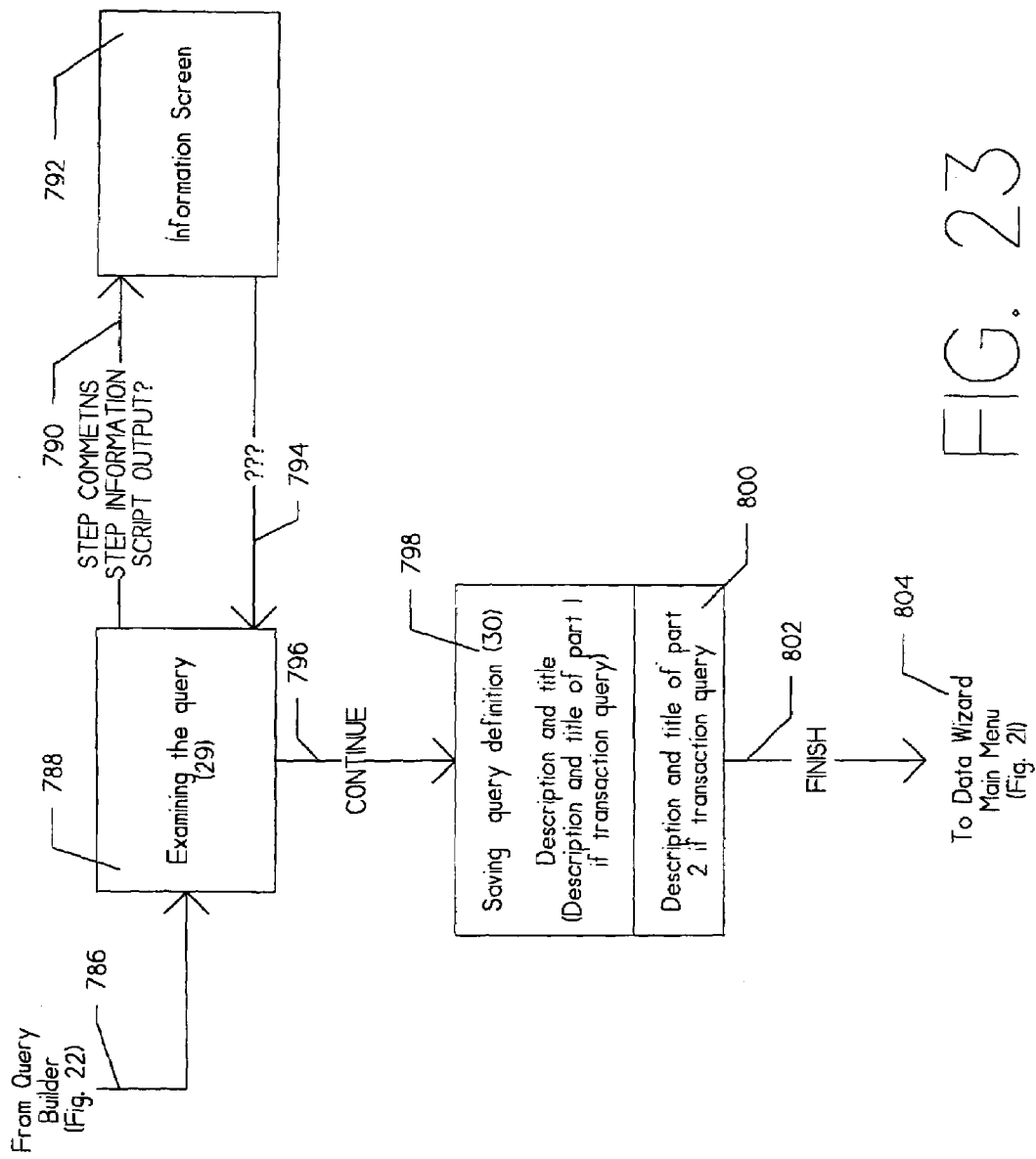

```
        IDT EXAMPLE
                          ╲───── 90
Version:AC:0.0╲
Truncation:AC:0╲────── 92
TypeCheck:AC:0╲──────── 93
ShoeData:ED:0:R ╲──── 94
From:DE:I:R
From:EV:Supplier:20:string
TableType:ED:I:R
TableType:EV:TableInfo:50:string
Inventory:ED:I:R
Inventory:BT:Inventory:7
Inventory:IH:ITEMNUMBER:10
Inventory:IH:QTY:5
Inventory:IH:TYPE:10
Inventory:IH:GENDER:6
Inventory:IH:SIZ:3
Inventory:IH:COLOR:31
Inventory:IH:UNITCOST:13
Date:AD:I:R
Date:AV:Date:10:string
Time:AD:I:R
Time:AV:Time:5:string
Row:ED:2:R
Row:BR:1
ItemNr:ED:2:R
ItemNr:EF:1:ITEMNUMBER:10:R:string
Quantity:AD:2:R
Quantity:AF:1:QTY:5:R:string
Type:ED:2:R
Type:EF:1:TYPE:10:L:string:
Gender:ED:2:O
Gender:EF:1:GENDER:6:L:string:UniSex
Size:ED:2:R
Size:EF:1:SIZ:3:L:string:
Color:ED:3:O
Color:EF:1:COLOR:31:L:string:White
Unitcost:ED:2:R
Unitcost:EF:1:UNITCOST:13:R:string:
Row:EE:2
Row:ER:a
Inventory:EE:1        ╱──── 96
Inventory:ET:1       ╱
```

FIG. 29

DTD EXAMPLE ⟋ 98

```
<!DOCTYPE ShoeData [

<!ELEMENT ShoeData (From, TableType, Inventory)>
<!ELEMENT From (#PCDATA)>
<!ELEMENT TableType (#PCDATA)>
<!ELEMENT Inventory (Row+)>
<!ATTLIST Inventory Date CDATA #REQUIRED>
<!ATTLIST Inventory Time CDATA #REQUIRED>
<!ELEMENT Row (ItemNr, Type, Gener?, Size, Color?, Unitcost)+>
<!ELEMENT ItemNr (#PCDATA)>
<!ATTLIST ItemNr Quantity CDATA #REQUIRED>
<!ELEMENT Type (#PCDATA)>
<!ELEMENT Gender (#PCDATA)>
<!ELEMENT Size (#PCDATA)>
<!ELEMENT Color (#PCDATA)>
<!ELEMENT Unitcost (#PCDATA)>
```

FIG. 30

```
XML INPUT DOCUMENT EXAMPLE
<?xml version="1.0" encoding="ISO-8859-1"?>            920
<ShoeData>
<From>Roseville Store</From>
<TableType>Low Inventory Count</TableType>
<Inventory Date="2000-12-05" Time="11:51">
<Row>
<ItemNr Quantity="0">32335</ItemNr>
<Type>Tennis</Type>
<Gender>Mens</Gender>
<Size>6</Size>
<Color>White/Zen Grey/New Spruce</Color>
<Unitcost>25.00</Unitcost>
</Row>
<Row>
<ItemNr Quantity="0">35410</ItemNr>
<Type>Running</Type>
<Gender>Womens</Gender>
<Size>5</Size>
<Color>White/Zen Grey/Neptune Blue</Color>
<Unitcost>19.70</Unitcost>
</Row>
<Row>
<ItemNr Quantity="0">35411</ItemNr>
<Type>Running</Type>
<Gender>Womens</Gender>
<Size>6</Size>
<Color>White/Zen Grey/Neptune Blue</Color>
<Unitcost>19.70</Unitcost>
</Row>
<Row>
<ItemNr Quantity="2">35420<ItemNr>
<Type>Running</Type>
<Gender>Womens</Gender>
<Size>5</Size>
<Color>White/Chlorine Blue/Hot Lime<Color>
<Unitcost>19.70</Unitcost>
</Row>
<Row>
<ItemNr Quantity="1">37421</ItemNr>
<Type>Golf</Type>
<Gender>Womens</Gender>
<Size>8</Size>
<Color>White/Fluorescent Pink</Color>
<Unitcost>35.00</Unitcost>
</Row>
</Inventory>
</ShoeData>
<Color>White/Black-Hot Lime, Neo Teal</Color>
<Unitcost>40.00</Unitcost>
</Row>
<Row>
<ItemNr Quantity="0">32474</ItemNr>
<Type>Tennis</Type>
<Gender>Womens</Gender>
<Size>8</Size>
<Color>White/Light Marine-Ultramarine</Color>
<Unitcost>25.00</Unitcost>
</Row>
<Row>
<ItemNr Quantity="1">35310</ItemNr>
<Type>Running</Type>
<Gender>Mens</Gender>
<Size>6</Size>
```

FIG. 31

STEP TO SAVE CURRENT TABLE FOR LATER USE

CROSS REFERENCE TO CO-PENDING APPLICATIONS

U.S. patent application Ser. No. 10/027,931, filed Dec. 21, 2001, and entitled, "XML Input Definition Table for Transforming XML Data to Internal Format" is a commonly assigned co-pending application incorporated herein by reference.

BACKGROUND OF THE INVENTION

1. Field of the Invention

The present invention generally relates to data base management systems and more particularly relates to enhancements for providing an interface between a legacy data base management system and Internet servers.

2. Description of the Prior Art

Data base management systems are well known in the data processing art. Such commercial systems have been in general use for more than 20 years. One of the most successful data base management systems is available from Unisys Corporation and is called the MAPPER→data base management system. The MAPPER system can be reviewed using the MAPPER User's Guide which may be obtained from Unisys Corporation.

The MAPPER system, which runs on proprietary hardware also available from Unisys Corporation, provides a way for clients to partition data bases into structures called cabinets, drawers, and reports as a way to offer a more tangible format. The MAPPER data base manager utilizes various predefined high-level instructions whereby the data base user may manipulate the data base to generate human-readable data presentations. The user is permitted to prepare lists of the various predefined high-level instructions into data base manager programs called "MAPPER Runs". Thus, users of the MAPPER system may create, modify, and add to a given data base and also generate periodic and aperiodic updated reports using various MAPPER Runs.

However, with the MAPPER system, as well as with similar proprietary data base management systems, the user must interface with the data base using a terminal coupled directly to the proprietary system and must access and manipulate the data using the MAPPER command language of MAPPER. Ordinarily, that means that the user must either be co-located with the hardware which hosts the data base management system or must be coupled to that hardware through dedicated data links. Furthermore, the user usually needs to be schooled in the command language of MAPPER (or other proprietary data base management system) to be capable of generating MAPPER Runs.

Since the advent of large scale, dedicated, proprietary data base management systems, the Internet or world wide web has come into being. Unlike closed proprietary data base management systems, the Internet has become a world wide bulletin board, permitting all to achieve nearly equal access using a wide variety of hardware, software, and communication protocols. Even though some standardization has developed, one of the important characteristics of the world wide web is its ability to constantly accept new and emerging techniques within a global framework. Many current users of the Internet have utilized several generations of hardware and software from a wide variety of suppliers from all over the world. It is not uncommon for current day young children to have ready access to the world wide web and to have substantial experience in data access using the Internet.

Thus, the major advantage of the Internet is its universality. Nearly anyone, anywhere can become a user. That means that virtually all persons are potentially Internet users without the need for specialized training and/or proprietary hardware and software. One can readily see that providing access to a proprietary data base management system, such as MAPPER, through the Internet would yield an extremely inexpensive and universally available means for accessing the data which it contains and such access would be without the need for considerable specialized training.

There are two basic problems with permitting Internet access to a proprietary data base. The first is a matter of security. Because the Internet is basically a means to publish information, great care must be taken to avoid intentional or inadvertent access to certain data by unauthorized Internet users. In practice this is substantially complicated by the need to provide various levels of authorization to Internet users to take full advantage of the technique. For example, one might have a first level involving no special security features available to any Internet user. A second level might be for specific customers, whereas a third level might be authorized only for employees. One or more fourth levels of security might be available for officers or others having specialized data access needs.

Existing data base managers have security systems, of course. However, because of the physical security with a proprietary system, a certain degree of security is inherent in the limited access. On the other hand, access via the Internet is virtually unlimited which makes the security issue much more acute.

Current day security systems involving the world wide web involve the presentation of a user-id and password. Typically, this user-id and password either provides access or denies access in a binary fashion. To offer multiple levels of secure access using these techniques would be extraordinarily expensive and require the duplication of entire databases and or substantial portions thereof. In general, the advantages of utilizing the world wide web in this fashion to access a proprietary data base are directly dependent upon the accuracy and precision of the security system involved.

The second major problem is imposed by the Internet protocol itself. One of the characteristics of the Internet which makes it so universal is that any single transaction in HTML (or XML) language combines a single transfer (or request) from a user coupled with a single response from the Internet server. In general, there is no means for linking multiple transfers (or requests) and multiple responses. In this manner, the Internet utilizes a transaction model which may be referred to as "stateless". This limitation ensures that the Internet, its users, and its servers remain sufficiently independent during operation that no one entity or group of entities can unduly delay or "hang-up" the communications system or any of its major components. Each transmission results in a termination of the transaction. Thus, there is no general purpose means to link data from one Internet transaction to another, even though in certain specialized applications limited amounts of data may be coupled using "cookies" or via attaching data to a specific HTML screen.

However, some of the most powerful data base management functions or services of necessity rely on coupling function attributes and data from one transaction to another in dialog fashion. In fact this linking is of the essence of MAPPER Runs which assume change of state from one command language statement to the next. True statelessness from a first MAPPER command to the next or subsequent MAPPER command would preclude much of the power of MAPPER (or any other modern data base management system) as a data base management tool and would eliminate data base management as we now know it.

Providing the system with the capability to save the needed information from transaction to transaction permits applications to be developed for a true dialog-type interface between the legacy data base management system and an Internet terminal. However, to make maximum use of the database management system from the Internet terminal, an appropriate customized user interface is required. With previous systems, the user interface was predefined in accordance with the related Internet connection.

An especially troublesome issue associated with implementation of communication between the Internet servers and the legacy data base management system involves the XML (extensible markup language) format. The enhanced flexibility of this protocol makes interface with an inherently incompatible format particularly difficult. It is simply too costly to manually translate each input and output XML message.

SUMMARY OF THE INVENTION

The present invention overcomes the disadvantages of the prior art by providing a mechanism for a service to save an intermediate, temporary data table for use in the service at a later time. In order to permit such functionality, the present invention must first provide an interface herein referred to generically as a gateway, which translates transaction data transferred from the user over the Internet in XML format into a format from which data base management system commands and inputs may be generated. The gateway must also convert the data base management system responses and outputs for usage on the user's Internet terminal. Thus, as a minimum, the gateway must make these format and protocol conversions. In the preferred embodiment, a number of gateways reside in the web server coupled to the user via the world wide web and coupled to proprietary data base management system.

To make access to a proprietary data base by Internet users practical, a sophisticated security system is required to prevent intentional or inadvertent unauthorized access to the sensitive data of an organization. As discussed above, such a security system should provide multiple levels of access to accommodate a variety of authorized user categories. In the preferred embodiment of the present invention, rather than defining several levels of data classification, the different classes of users are managed by identifying a security profile as a portion of those service requests requiring access to secure data. Thus, the security profile accompanies the data/service to be accessed. User information is correlated to the access permitted. This permits certain levels of data to be accessed by one or more of the several classes of user.

In the preferred mode of practicing the present invention, a given user is correlated with a security profile. Upon preparation of the service request which provides Internet access to a given portion of the data base, the service request developer specifies which security profiles are permitted access to the data or a portion thereof. The service request developer can subsequently modify the accessibility of any security profile. The utility of the system is greatly enhanced by permitting the service request developer to provide access to predefined portions of the data, rather than being limited to permit or deny access to all of the data involved.

The present invention also permits the system to modify and redefine the security profiles during operation. In accordance with the preferred technique, the system administrator can access an individual user and directly modify the security profile just for that user. This is accomplished by calling up an HTML page for the selected user showing the security profile of record. The system administrator makes changes as appropriate. The Data Wizard Security Service generates script associated with the security profile change which provides the selected user with the new set of access privileges.

Whereas the gateway and the security system are the minimum necessary to permit the most rudimentary form of communication between the Internet terminal of the user and the proprietary data base management system, as explained above, the Internet is a "stateless" communication system; the addition of the gateway and the security system do not change this statelessness. To unleash the real power of the data base management system, the communication protocol between the data base and the user requires functional interaction between the various data transfers.

The present invention adds security management and state management to this environment. Instead of considering each transfer from the Internet user coupled with the corresponding server response as an isolated transaction event as defined by the world wide web, one or more related service requests may be functionally associated in a service request sequence as defined by the data base management system into a dialog.

A repository is established to store the state of the service request sequence. As such, the repository can store intermediate requests and responses, as well as other data associated with the service request sequence. Thus, the repository buffers commands, data, and intermediate products utilized in formatting subsequent data base management service requests and in formatting subsequent data to be available to the user's browser.

The transaction data in HTML or XML format received by the server from the user, along with the state information stored in the repository, are processed by a service handler into a sequence of service requests in the command language of the data base management system.

Through the use of the repository to store the state of the service request sequence, the service handler to execute data base management commands, the world wide web user is capable of performing each and every data base management function available to any user, including a user from a proprietary terminal having a dedicated communication link which is co-located with the proprietary data base management system hardware and software. In addition, the data base management system user at the world wide web terminal is able to accomplish this, without extensive training concerning the command language of the data base management system.

In accordance with the preferred mode of the present invention, the Cool ICE Data Wizard Join Service provides a web based interface that allows a developer to create a web based service that joins tables from MAPPER Reports, MAPPER runs, databases that are ODBC compliant, and many RDMS, and MAPPER. This service renders the resulting table to the web. This result can be rendered to the web either by a Cool ICE Script or by an Active Server Page.

In accordance with the present invention, a customized user interface is built from multiple components stored in the proprietary database management system. Unlike previous approaches, the web-based service component is split into multiple components: an application service component, a screen component, a receiving service component, and a new template component.

The screen component calls the template component, which collects all of the indexed pieces that it needs from within the proprietary database and displays this dynamically built data in the browser. When an action against the data is initiated from the browser, the receiving service component is called to perform the specified action and then inform the user that the action has completed. These multiple components seamlessly interact to build a consistent user interface that can easily be tailored to meet users' presentation and performance needs.

By separating the code into multiple components, this new architecture allows adaptability to the user's environment, ease of maintenance, and ease of localization. Users can easily alter the look-and-feel of the user interface by making changes to the new template component. For example, changes to layout, color, use of graphics, or addition of a company-specific logo can quickly and easily be done by simply making changes to the template component. By choosing to exclude large graphical elements from the template component, performance enhancements may also be realized. In addition, the template component gives the user a wide range of languages in which to program their user interface including HTML, HDML, XML, WML, JavaScript, Vbscript, and WMLscript. This tremendous flexibility gives the user a fast and effective way to tailor their user interface.

In accordance with the present invention, the preferred embodiment employs an element to source mapping tree through which the translation between XML and the internal system is defined. The XML element to source mapping tree is a structure which may be depicted on the left side of an appropriate translation window. It is a visual structural representation of the XML document which is being mapped. The structural definition of the tree may be derived in a number of ways including accessing a previous stored definition, user addition or elements and attributes, user deletion of elements and attributes, and user modification of elements and attributes.

The XML tree contains elements and attributes that represent the data in an XML document. The tree expands and contracts by operator action. The Elements link at the top of the XML tree structure provides a set of actions for the XML tree. Actions for individual elements and attributes are shown when an element or attribute is in focus. These actions are shown in an Actions box on the right pane of the window. Information about elements and attributes are shown by symbols to the right of the name field of each tree item:

Attribute (a);
Value (v);
Required Repeating (+);
Optional (?); and
Optional Repeating (*).

An element or attribute is mapped to a source by first clicking on the element or attribute name, or be clicking on the radio button to the right of the name. Then click on the radio button to the left of the source item it will be mapped to. If the source item is a table, the mapping tool will automatically generate the element tree structure of the mapping and map all of the supplements in the tree to the row and columns for the table.

The system prevents use of the same name for elements which have different structures. However, Master copies permit more than one element having the same name and structure. Thus, Master copies should be used in situations where the same type of information appears more than once in an XML document.

One convenient method for automatically defining the structure of the XML mapping tree is an external Document Type Definition (DTD). The DTD may be stored in memory or may be received externally from over the Internet. To provide automatic mapping, a DTD is required which is a well defined, consistent structure that corresponds to a set of single data values and/or one or more two dimensional tables with columns and rows. It cannot be an XML document that has an object or network structure that does not map to a set of variables and tables. Specifically, an XML document cannot be handled if it has any of the following properties:

a non-fixed structure (e.g., DTD with ALL as an element form);
a recursive element structure;
a repeated element within a repeated element;
a choice structure in an element; and
an unnamed optional structure within an element.

There is a special window for the selection of a DTD.

A key facility for providing the translation is an Input Definition Table (IDT). This is a text table which defines how an XML input document is to be converted into a form to be used by the Cool ICE system. For each type of XML document that is to be used as input to a Cool ICE service, there is a corresponding IDT.

An IDT is created by the Cool ICE XML Mapping Tool from and input Component Definition Mapping (CDM). The IDT has the same name as the CDM with an IDT suffix. Only a CDM that is an input definition mapping can be used to create and IDT. Each Cool ICE service that can be activated by an XML input must have an IDT associated with it. This association is made by a separate piece of activation code that retrieves the IDT from the repository. As well as defining the conversion for an XML document, the IDT also specifies acceptance criteria that an input document must meet before a service associated with it can be activated. The IDT for a service resides in the Cool ICE repository.

A key component to adding temporary computational data to an XML output document is the ability to save said data as a table for future use. The save current table step provides this capability and more. The current computational data saved by this step appears as a table to the Cool ICE System.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 18 is a detailed table of the registry settings for initially tracing for an application;

FIG. 20A is a table showing typical definitions for policy trace flags;

FIG. 20B is a table showing a typical run-time trace call;

FIG. 23 is a detailed flow chart showing completion of the Query Builder process;

FIG. 29 is a sample IDT for the transfer of shoes to inventory of a retail outlet;

FIG. 30 is the DTD corresponding to the IDT of FIG. 28;

FIG. 31 shows a sample XML message corresponding to the tables of FIGS. 28 and 29.

DETAILED DESCRIPTION OF THE PREFERRED EMBODIMENTS

The present invention is described in accordance with several preferred embodiments which are to be viewed as illustrative without being limiting. These several preferred embodiments are based upon MAPPER data base management system, and the Cool ICE software components, all available from Unisys Corporation.

Figure 1:
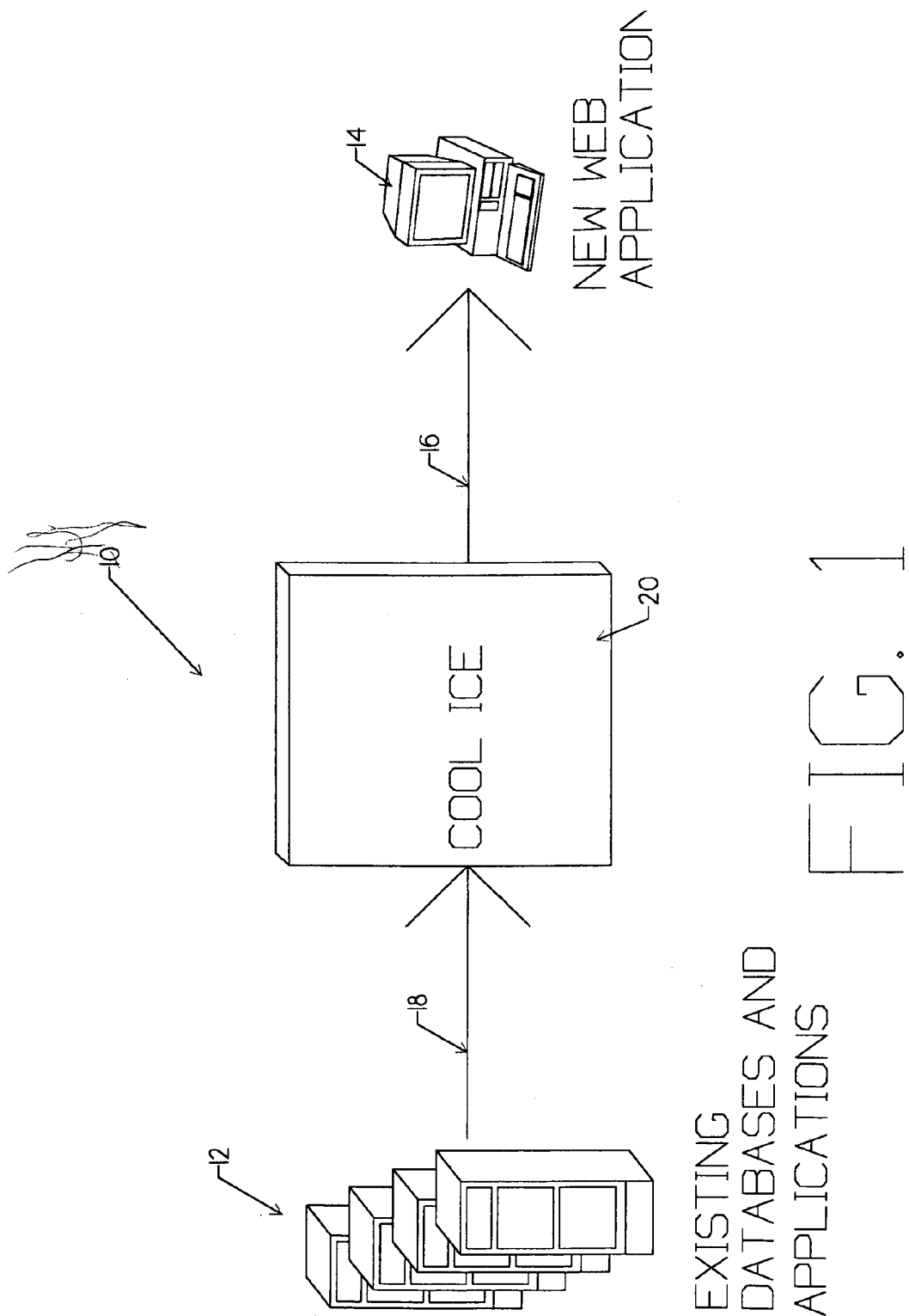
FIG. 1 is pictographic view of the Cool ICE system coupled between a user on the world wide web and an existing proprietary data base management system.

FIG. 1 is an overall pictographic representation of a system 10 permitting access to a proprietary data base management system via an Internet terminal. Existing data bases and applications 12 represents commercially available hardware and software systems which typically provide select users with access to proprietary data and data base management functions. In the preferred embodiment, existing data bases and applications 12 represents one or more data bases prepared using MAPPER data base management system, all available from Unisys Corporation. Historically, existing data bases and applications 12 could only be accessed from a dedicated, direct terminal link, either physically co-located with the other system elements or connected thereto via a secured dedicated link.

With the preferred mode of the present invention, communication between new web application terminal 14 and existing data bases and applications 12 is facilitated. As discussed above, this permits nearly universal access by users world wide without specialized hardware and/or user training. The user effects the access using standardized HTML and XML transaction language through world wide web link 16 to the Cool ICE system 20, which serves as a world wide web server to world wide web link 16.

Cool ICE system 20 appears to existing data bases and applications 12 as a data base management system proprietary user terminal over dedicated link 18. Oftentimes, dedicated link 18 is an intranet or other localized link. Cool ICE system 20 is currently available in commercial form as Cool ICE Revision Level 2.1 from Unisys Corporation.

Figure 2:
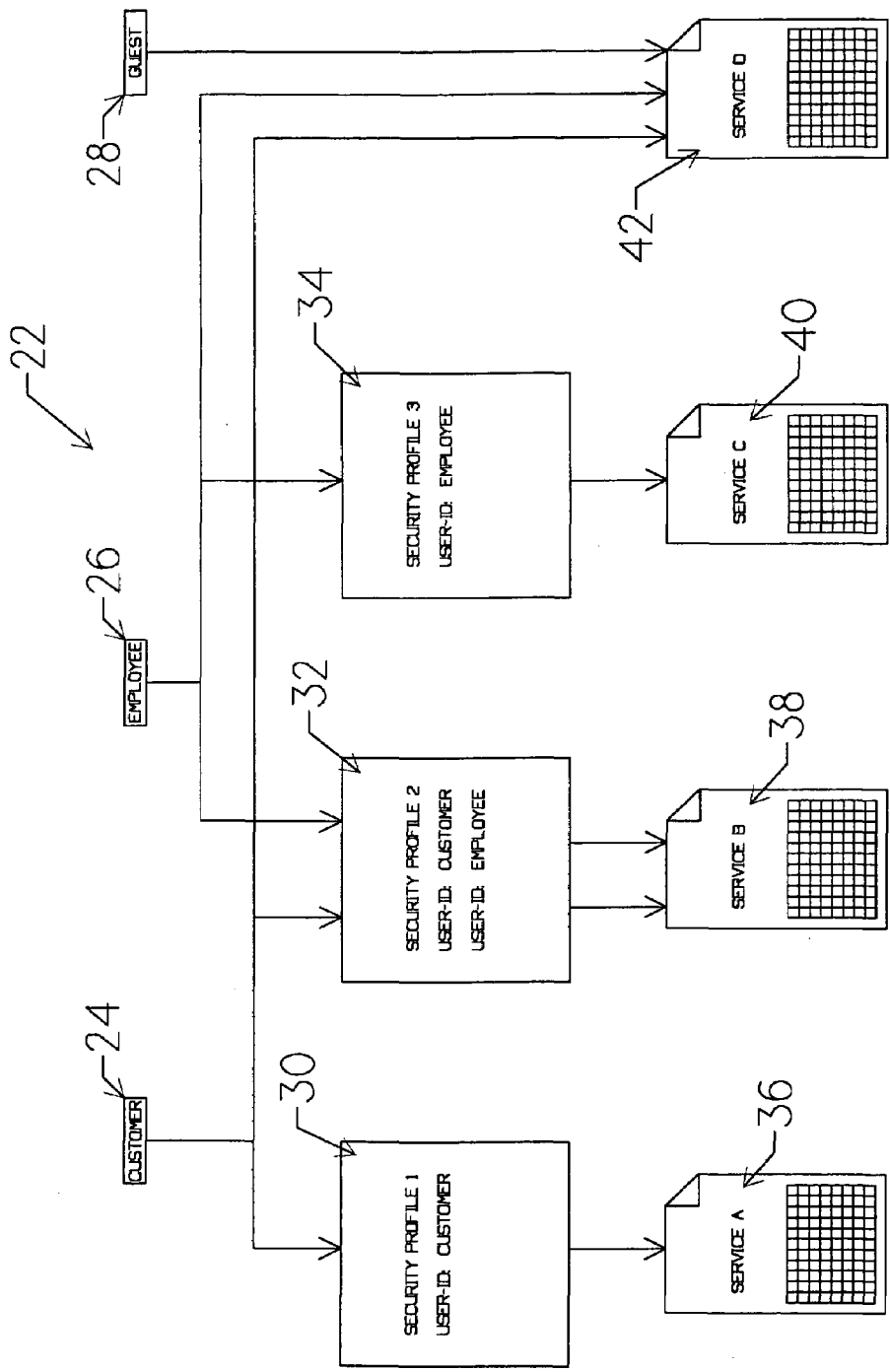
FIG. 2 is a schematic drawing showing the operation of a multi-level security system in accordance with the preferred embodiment of the present invention.

FIG. 2 is a basic schematic diagram of security system 22 of the preferred mode of the present invention. By way of example, there are four categories of service defined, each with its own functionality and portion of the data base. Service A 36 contains data and functions which should only be made available to customers. Service B 38 contains data and functions which should only be made available to customers or employees. Service C 40 contains data and functions which should only be made available to employees, and Service D 42, containing the least restrictive data and functions may be made available to anyone, including the general public.

In a typical application, Service D 42 might contain the general home page information of the enterprise. It will consist of only the most public of information. It is likely to include the name, address, e-mail address, and phone number of the enterprise, along with the most public of the business details. Usually, Service D 42 would include means of presenting the information in a sufficiently interesting way to entice the most casual of the public user to make further inquiry and thus become more involved with the objectives of the enterprise. Service D 42 represents the lowest level of security with data and functions available to all.

Service C 40 is potentially the highest level of classification. It contains data and functions which can be made available only to employees. In actual practice, this might entail a number of sub levels corresponding to the various levels of authority of the various employees. However, some services may be so sensitive that the enterprise decides not to provide any access via the Internet. This might include such things as strategic planning data and tools, advanced financial predictions, specific information regarding individual employees, marketing plans, etc. The penalty for this extreme security measure is that even authorized individuals are prohibited from accessing these services via the Internet, and they must take the trouble to achieve access via an old-fashioned dedicated link.

Customers and employees may share access to Service B 38. Nevertheless, these data and functions are sufficiently sensitive that they are not made public. Service B 38 likely provides access to product specifications, delivery schedules and quantities, and pricing.

For customer access only is Service A 36. One would expect marketing information, along with specific account information, to be available here.

These four service levels (i.e., Service A 36, Service B 38, Service C 40, and Service D 42) are regulated in accordance with three security profiles. The lowest level of security does not require a security profile, because any member of the general public may be granted access. This can be readily seen as guest category 28 (e.g., a member of the public) can directly access Service D 42. Of course, all other categories of user may also directly access Service D 42, because all members of the more restrictive categories (e.g., customers and employees) are also members of the general public (i.e., the least restrictive category).

Security Profile #1, 30 permits access to Service A 36 if and only if the requester seeking access is a customer and therefore a member of customer category 24. Members of customer category 24 need to identify themselves with a customer identification code in order to gain access. The assigning and processing of such identification codes are well known to those of skill in the art.

Similarly, Security Profile #3, 34 permits access to Service C 40 if and only if the requestor seeking access is an employee and therefore a member of employee category 26. Security Profile #2, 32 permits access to Service B 38 to requesters from either customer category 24 or employee category 26, upon receipt of a customer identification code or an employee identification code. A more detailed description of the security system of the preferred mode of the present invention is found below.

Figure 3:
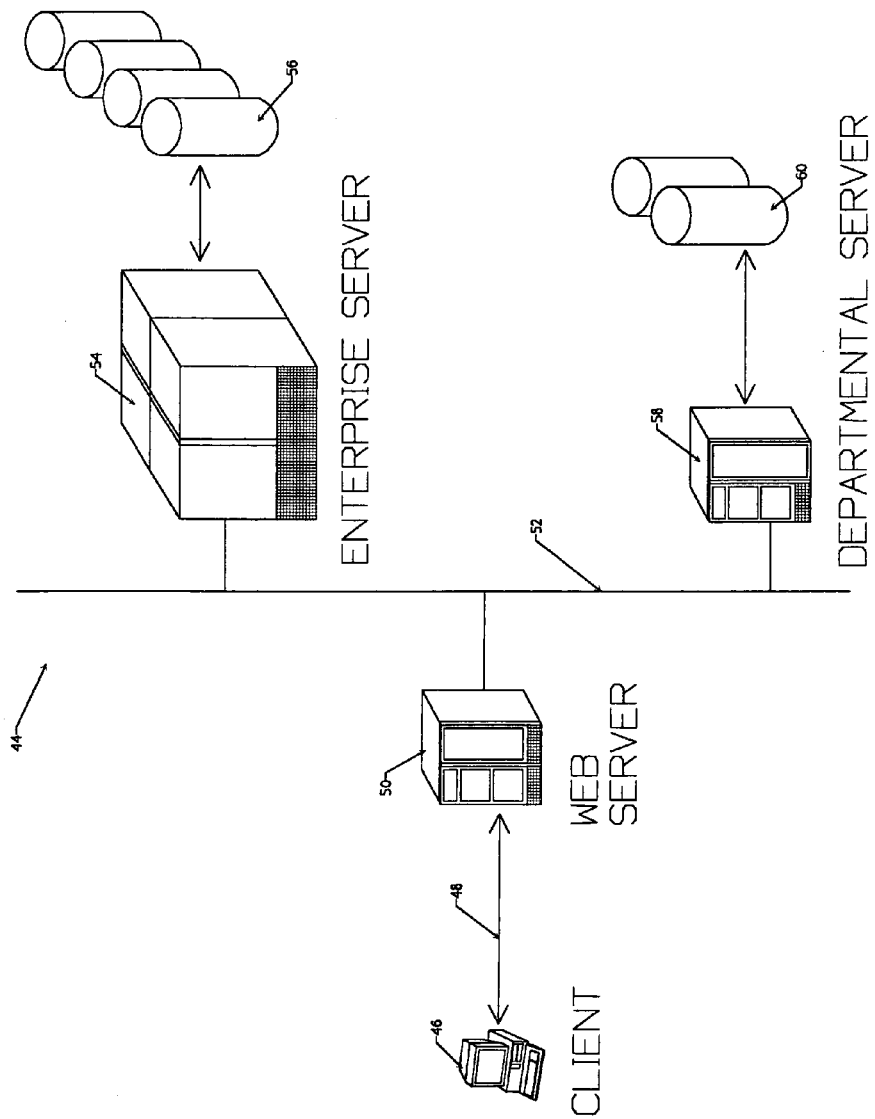
FIG. 3 is a pictographic view of the hardware of the preferred embodiment.

FIG. 3 is a pictorial diagram of hardware suite 44 of the preferred embodiment of the present invention. The client interfaces with the system via Internet terminal 46. Terminal 46 is an industry compatible, personalized computer having a suitable web browser, all being readily available commercial products. Internet terminal 46 communicates over world wide web access 48 using standardized HTML and XML protocol. The Cool ICE system is resident in web server 50, which is coupled to Internet terminal 46 via world wide web access 48. In the preferred mode, web server 50 is owned and operated by the enterprise owning and controlling the proprietary data base management system. Web server 50 may serve as the Internet access provider for Internet terminal 46. Web server 50 may be a remote server site on the Internet if the shown client has a different Internet access provider. This would ordinarily occur if the shown client were a customer or guest.

In addition to being coupled to world wide web access 48, web server 50, containing the Cool ICE system, can be coupled to network 52 of the enterprise as shown. Network 52 provides the system with communication for additional enterprise business purposes. Thus, The Cool ICE application or web server 50 and others granted access may communicate via network 52 within the physical security provided by the enterprise. Also coupled to network 52 is departmental server 58 having departmental server storage facility 60. Additional departmental servers (not shown) may be coupled to network 52. The enterprise data and enterprise data base management service functionality typically resides within enterprise server 54, departmental server 58, and any other departmental servers (not shown). Normal operation in accordance with the prior art would provide access to this data and data base management functionality via network 52 to users directly coupled to network 52.

In the preferred mode of the present invention, access to this data and data base management functionality is also provided to users (e.g., Internet terminal 46) not directly coupled to network 52, but indirectly coupled to network 52 via web server 50 and the Cool ICE Server application components. As explained below in more detail, web server 50 provides this access utilizing the Cool ICE system resident in web server 50.

Figure 4:
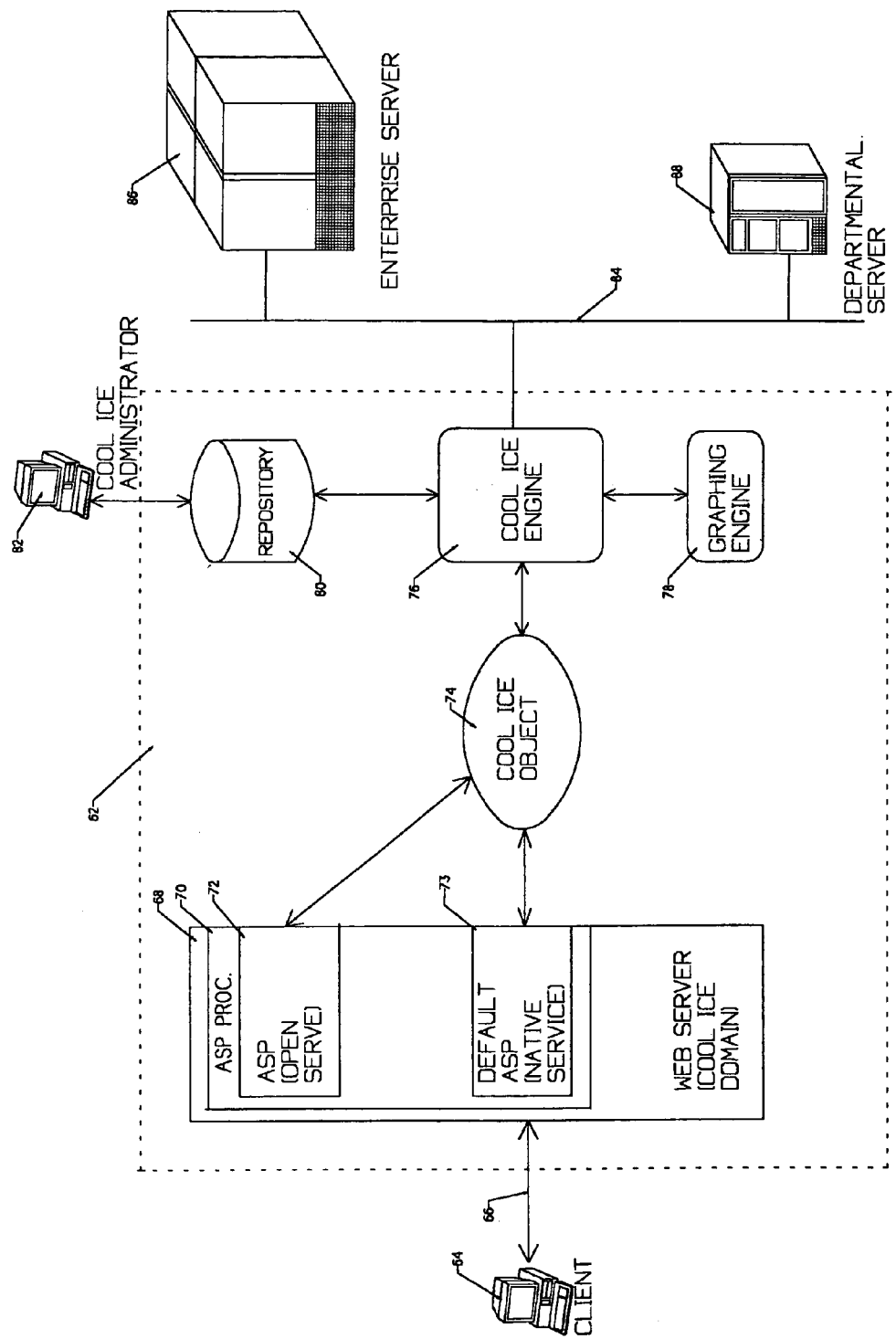
FIG. 4 is a semi-schematic diagram of the operation of the Cool ICE system.

FIG. 4 is pictographic view of the system of FIG. 3 with particular detail showing the organization and operation of the Cool ICE system 62, which is resident in the web server (see also FIG. 3). In this view, the client accesses the data base management system within the enterprise via Internet terminal 54 which is coupled to the web server 68 by world wide web path 66. Again, the Internet terminal 54 is preferably an industry standard computer utilizing a commercially available web browser.

The basic request/response format of the Cool ICE system involves a "service" (defined in greater detail below) which is an object of the Cool ICE system. The service is a predefined operation or related sequence of operations which provide the client with a desired static or dynamic result. The services are categorized by the language in which they were developed. Whereas all services are developed with client-side scripting which is compatible with Internet terminal 54 (e.g., XML), the server-side scripting defines the service category. Native services utilize Cool ICE script for all server-side scripting. On the other hand, open services may have server-side scripting in a variety of common commercial languages including Jscript, VBScript, ActiveX controls, and HTML. Because native services are developed in the Cool ICE script (run) language, greater development flexibility and variety are available with this technique.

Web server 68 provides processor 70 for Active Server Pages (ASP's) which have been developed as open services 72 and a Default ASP 73 for invoking native services. After the appropriate decoding within a native or open service, a call to the necessary Cool ICE object 74 is initiated as shown. The selected service is processed by the Cool ICE engine 76.

Repository 80 is a storage resource for long term storage of the Cool ICE service scripts and short term storage of the state of a particular service. Further details concerning repository 80 may be found by consulting the above referenced, commonly-assigned, co-pending U.S. Patent Application. In the preferred mode of the present invention, the service scripts stored in repository 80 are typically very similar to MAPPER runs as described above. For a more detailed description of MAPPER runs, Classic MAPPER User Manual is available from Unisys Corporation and incorporated herein by reference.

Cool ICE engine 76 sequences these previously stored command statements and can use them to communicate via network 84 with other data base management system(s) (e.g., MAPPER) resident on enterprise server 86 and/or departmental server 88. The storage capability of repository 80 is utilized by Cool ICE engine 76 to store the state and intermediate products of each service until the processing sequence has been completed. Following completion, Cool ICE engine 76 retrieves the intermediate products from repository 80 and formats the output response to the client, which is transferred to Internet terminal 54 via web server 68 and world wide web path 66.

Cool ICE Administrator 82 is available for coordination of the operation of Cool ICE system 62 and thus can resolve conflicts, set run-time priorities, deal with security issues, and serve as a developmental resource. Graphing engine 78 is available to efficiently provide graphical representations of data to be a part of the response of a service. This tends to be a particularly useful utility, because many of the existing data base management systems have relatively sparse resources for graphical presentation of data.

The combination of Cool ICE object 74, Cool ICE engine 76, and repository 80 permits a rather simplistic service request from Internet terminal 54 in dialog format to initiate a rather complex series of data base management system functions. In doing so, Cool ICE engine 76 emulates an intranet user of the data base management system(s) resident on enterprise server 86 and/or departmental server 88. This emulation is only made possible, because repository 80 stores sequences of command language statements (i.e., the logic of the service request) and intermediate products (i.e., the state of the service request). It is these functions which are not available in ordinary dialog on the world wide web and are therefore not even defined in that environment.

Figure 5:
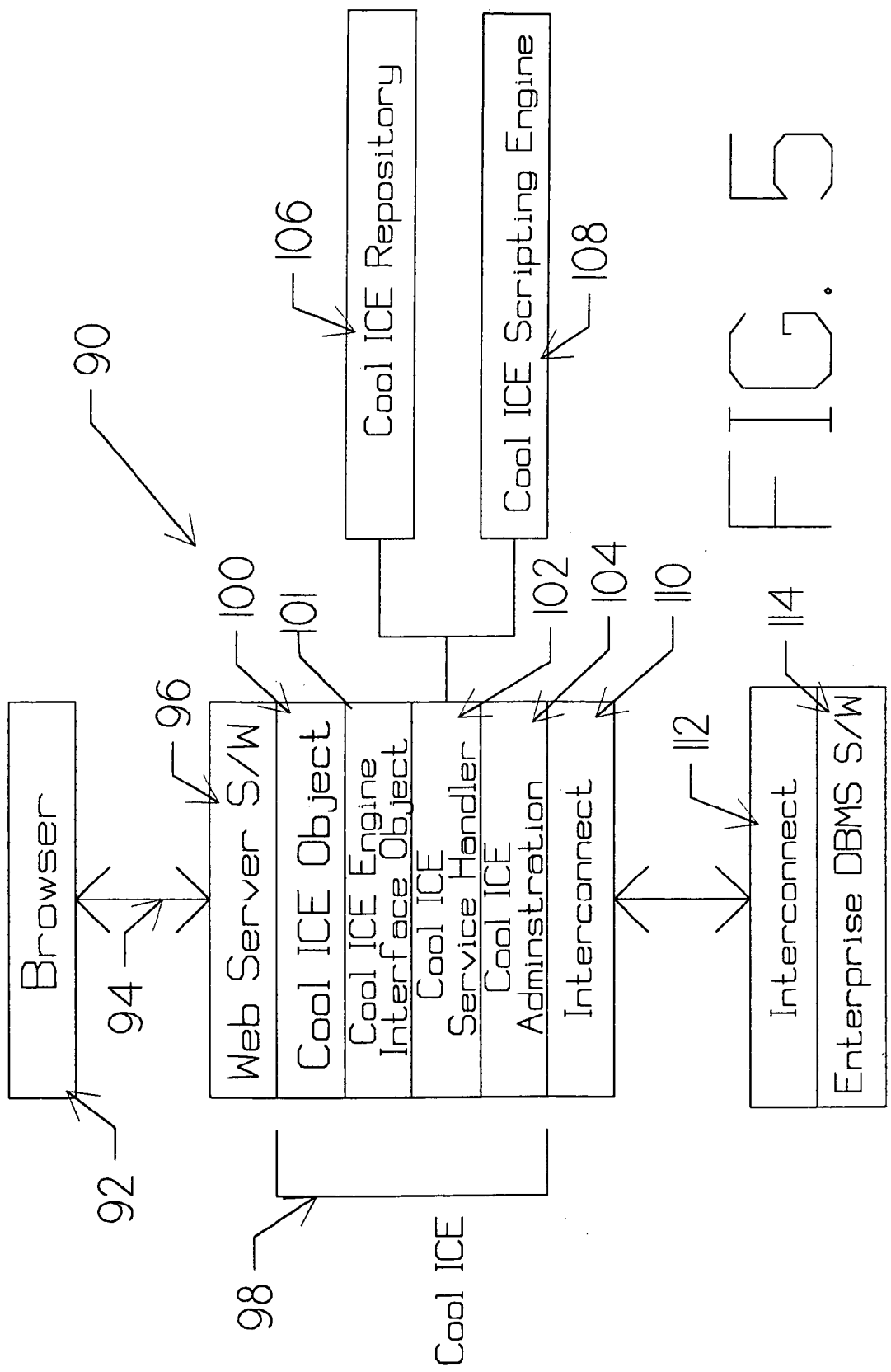
FIG. 5 is an overall schematic view of the software of the Cool ICE system.

FIG. 5 is a schematic diagram 90 of the software components of the Cool ICE system and the software components to which it interfaces in the preferred mode of the present invention. The client user of the Cool ICE system interfaces directly with web browser 92 which is resident on Internet terminal 54 (see also FIG. 4). Web browser 92 is a commercially available browser. The only special requirement of web browser 92 is that it be capable of supporting frames.

Web browser 92 communicates with web server software 96 via Internet standard protocol using XML language using world wide web path 94. Web server software 96 is also commercially available software, which is, of course, appropriate for to the web server host hardware configuration. In the preferred mode of the present invention, web server software 96 is hosted on Windows ITS-based server available from Microsoft Corporation.

Cool ICE system software 98 consists of Cool ICE Object {the gateway) 100, Cool ICE service handler 102, Cool ICE administration 104, Cool ICE repository 106, and Cool ICE Scripting Engine 108. It is these five software modules which establish and maintain an interface to web server software 96 using corn interfaces and interface to Cool ICE's internal and external data base management system.

Cool ICE object 100 is the interface between standard, commercially available, web server software 96 and the internal Cool ICE system scripting engine with its language and logic facilities. As such, Cool ICE object 100 translates the dialog format, incoming HTML service request into internal Cool ICE requests for service. Intrinsic in this translation is a determination of the service category (see also FIG. 4)—that is whether the service request is a native service (i.e., with a default Cool ICE server-side scripting) or an open service (i.e., with server-side scripting in another commercial language using the Cool ICE object 100).

The service request, received from Cool ICE object 100, is utilized by Cool ICE service handler 102 to request the corresponding service action script from Cool ICE repository 106 and to open temporary state storage using Cool ICE repository 106. Cool ICE service handler 102 sequences through the service input variables of the object received from Cool ICE object 100 and transfers each to Cool ICE repository 106 for temporary storage until completion of the service request. Cool ICE service handler 102 retrieves the intermediate products from Cool ICE repository 106 upon completion of the service request and formulates the Cool ICE response for transfer to browser 92 via web server software 96 and world wide web path 94.

Cool ICE administration 104 implements automatic and manual control of the process. It provides for record keeping, for resolution of certain security issues, and for development of further Cool ICE objects. Interconnect 110 and interconnect 112 are software interface modules for communicating over the enterprise network (see also FIG. 4). These modules are dependent upon the remaining proprietary hardware and software elements coupled to the enterprise network system. In the preferred mode of the present invention, these are commercially available from Unisys Corporation.

Figure 6:
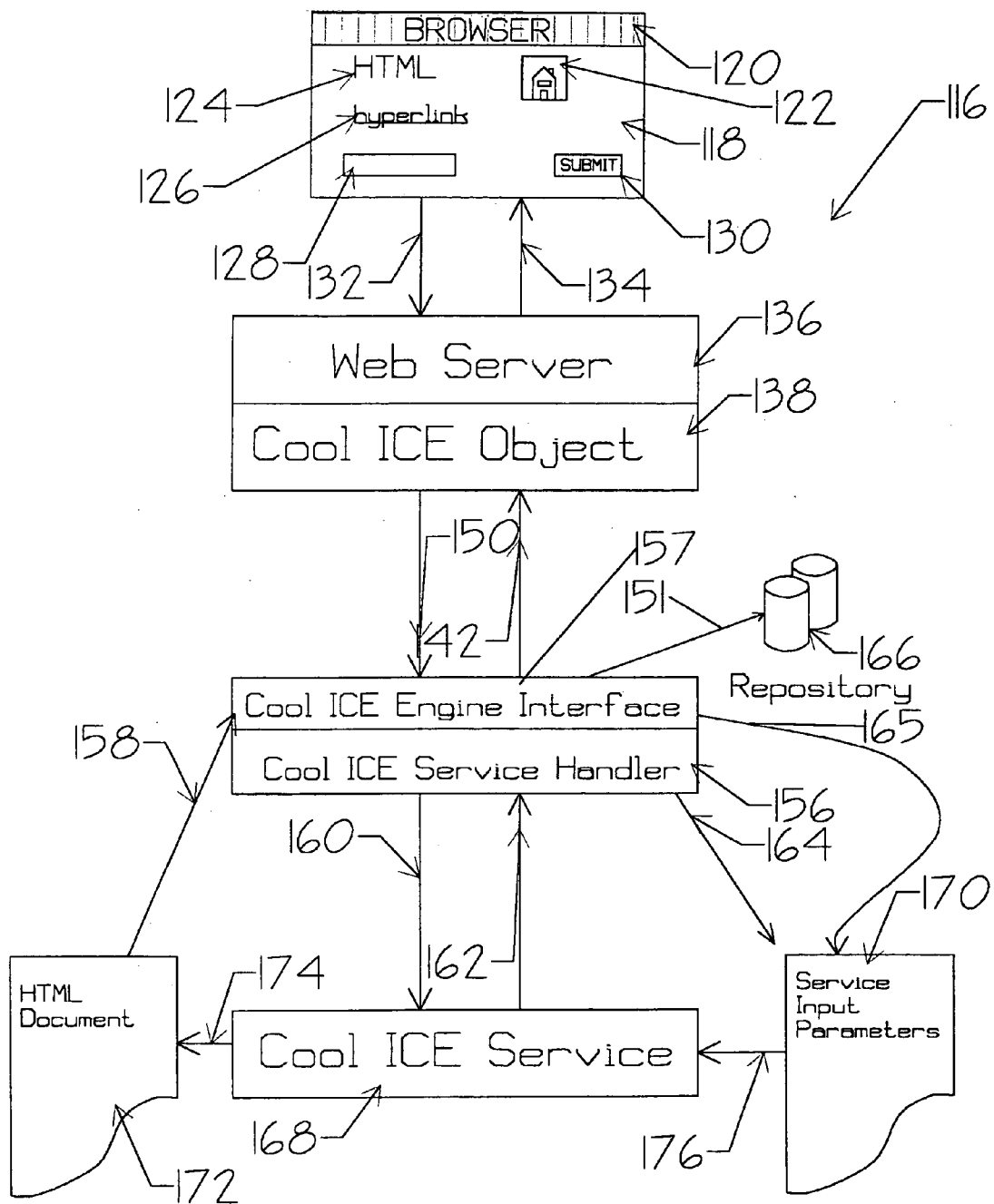
FIG. 6 is a schematic view of a service request.

FIG. 6 is a schematic diagram 116 showing the processing of a service request by the Cool ICE system. Screen 118 is the view as seen by the client or user at an Internet terminal (see also FIG. 4). This screen is produced by the commercially available browser 120 selected by the user. Any such industry standard browser is suitable, if it has the capability to handle frames. The language of screen 118 is HTML 124. Hyperlinks 126 is used in locating the URL of the Cool ICE resident server. The components of the URL are as follows. In many instances, this will simply be the Internet access provider of the Internet terminal, as when the Internet terminal is owned by the enterprise and the user is an employee. However, when the user is not an employee and the Internet terminal is not necessarily owned by the enterprise, it becomes more likely that hyperlinks 126 identifies a remotely located server.

Icon 122 is a means of expressly identifying a particular service request. Such use of an icon is deemed to be unique. Additional detail concerning this use of an icon is available in the above identified, commonly assigned, co-pending U.S. Patent application. Window area 128 provides for the entry of any necessary or helpful input parameters. Not shown are possible prompts for entry of this data, which may be defined at the time of service request development. Submit button provides the user with a convenient means to transmit the service request to the web server in which the Cool ICE system is resident.

Upon "clicking on" submit button 130, screen 118 is transmitted to web server 136 via world wide web path 132. As discussed above, world wide web path 132 may be a telephonic dial-up of web server 136 or it might be a long and complex path along the Internet if web server 136 is remote from the originating Internet terminal. Web server 136 is the software which performs the retrieval of screen 118 from world wide web path 132.

Screen 118 is transferred from web server 136 to Cool ICE object 138, wherein it is converted to the internal Cool ICE protocol and language. A browser input is opened at storage resource 166 via paths 150 and 151. Thus the initial service request can be accessed from storage resource 166 during processing up until the final result is transferred back to the user. This access readily permits multi-step and iterative service request processing, even though the service request was transferred as a single Internet dialog element. This storage technique also provides initially received input parameters to later steps in the processing of the service request.

Cool ICE object 138 notifies Cool ICE service handler 156 through the Cool ICE Engine Interface 157 that a service request has been received and logged in. The service request itself is utilized by Cool ICE service handler 156 to retrieve a previously stored sequence of data base management system command statements from repository 166. Thus, in the general case, a single service request will result in the execution of a number of ordered data base management system commands. The exact sequence of these commands is defined by the service request developer as explained in more detail below.

Service input parameters 170 is prepared from the service request itself and from the command sequence stored in repository 166 as shown by paths 164 and 165. This list of input parameters is actually stored in a dedicated portion of repository 166 awaiting processing of the service request.

Each command statement from repository 166 identified with the service request object is sequentially presented to a Cool ICE service 168 for processing via path 160. The corresponding input parameters 170 is coupled with each command statement via path 176 to produce an appropriate action of the enterprise data base management system at Cool ICE service 168. After the enterprise data base management system has responded to a given query, the intermediate products are stored as entries in HTML document 172 which is also stored in a dedicated portion of repository 166.

After all command statements corresponding to the service request have been processed by the enterprise data base management system and HTML document 172 has been completed, the result is provided via path 158 to Cool ICE Engine Interface 157. Cool ICE object 138 receives the browser output via path 150. The response is converted to HTML protocol and transferred by web server 136 and world wide web path 134 to be presented to the user as a modified screen (not shown).

Figure 7:
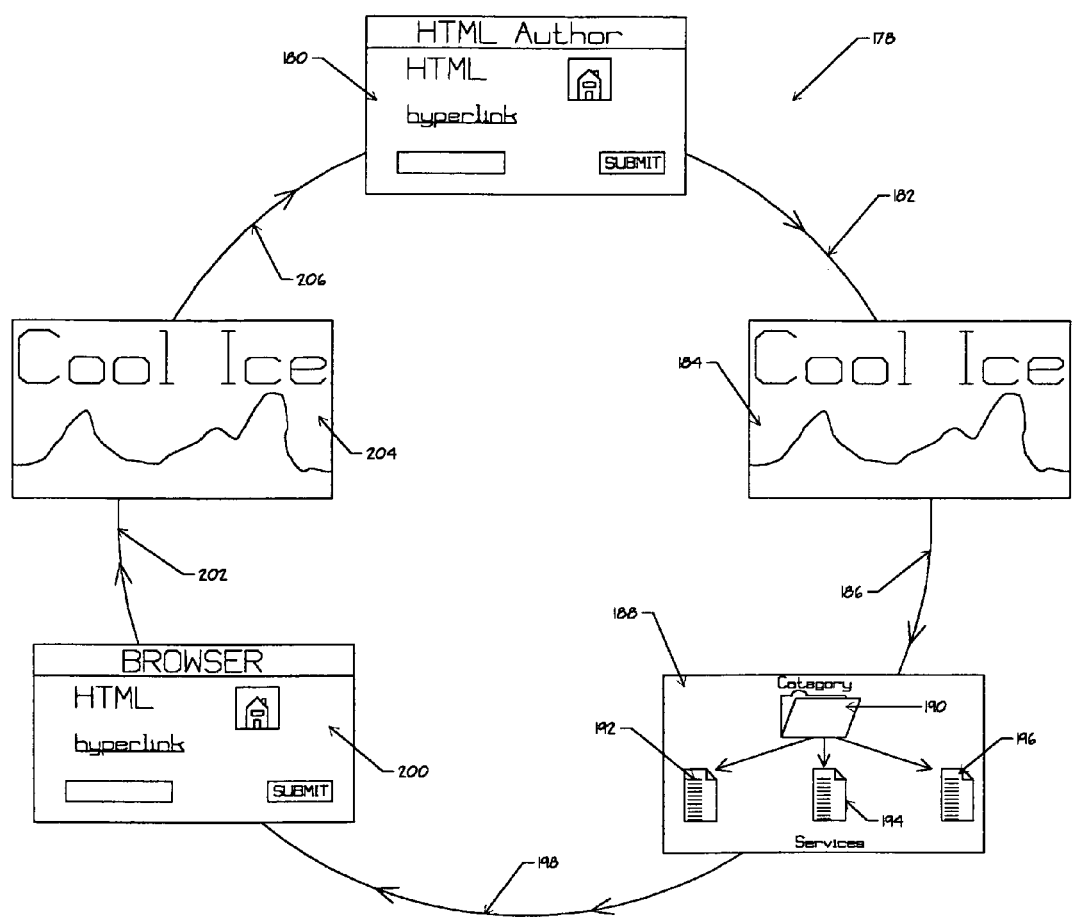
FIG. 7 shows a schematic view of a service request sequence.

FIG. 7 is a pictographic drawing 178 of the development process for creating a Cool ICE service. HTML document 180 is created utilizing any commercially available standard HTML authoring tool (e.g., Microsoft FrontPage). The resulting HTML document 180 is stored as a normal .HTM file. This file will be utilized as a template of the service to be developed.

The authoring process moves along path 182 to invoke the administration module of the Cool ICE system at element 184. The new dynamic service is created using HTML document 180 stored as a normal .HTM file as a template. As HTML document 180 is imported into Cool ICE, sequences of script for the beginning and end of the HTML code are automatically appended to the service. Required images, if any, are also uploaded onto the web server (see also FIGS. 5 and 6). The service is edited by inserting additional Cool ICE script, as required. A more detailed description of the editing process may be found in Cool ICE User's Guide, Revision 2.0, available from Unisys Corporation and incorporated herein by reference.

The completed service script is transferred along path 186 to element 188 for storage. The service is stored as a service object in the repository (see also FIGS. 5 and 6). Storage is effected within the appropriate category 190 as discussed above, along with services 192, 194, and 196 within the same category.

The process proceeds along path 198 to element 200 for testing. To perform the testing, the URL for the newly created service is entered into the browser of the Internet terminal, if known. The typical URL is as follows:

http://machine-name/Cool-ICE/
default.asp?Category=Examples & Service=FRME+01

If the URL for the new service is not known, a list of the available services may be determined from the Cool ICE system by specifying the Cool ICE URL as follows:

http;://machine-name/Cool-ICE

This call will result in a presentation of a menu containing the defined categories. Selecting a category from the list will result in a menu for the services defined within that category. The desired service can thus be selected for testing. Selection of the service by either means will result in presentation of the HTML page as shown at element 200.

The process proceeds to element 204 via path 202, wherein the HTML page may be enhanced. This is accomplished by exporting the HTML document from the Cool ICE administration module to a directory for modification. By proceeding back to HTML document 180 via path 208, the exported HTML template is available for modification using a standard HTML authoring tool. After satisfactory completion, the finished HTML document is saved for future use.

Figure 8:
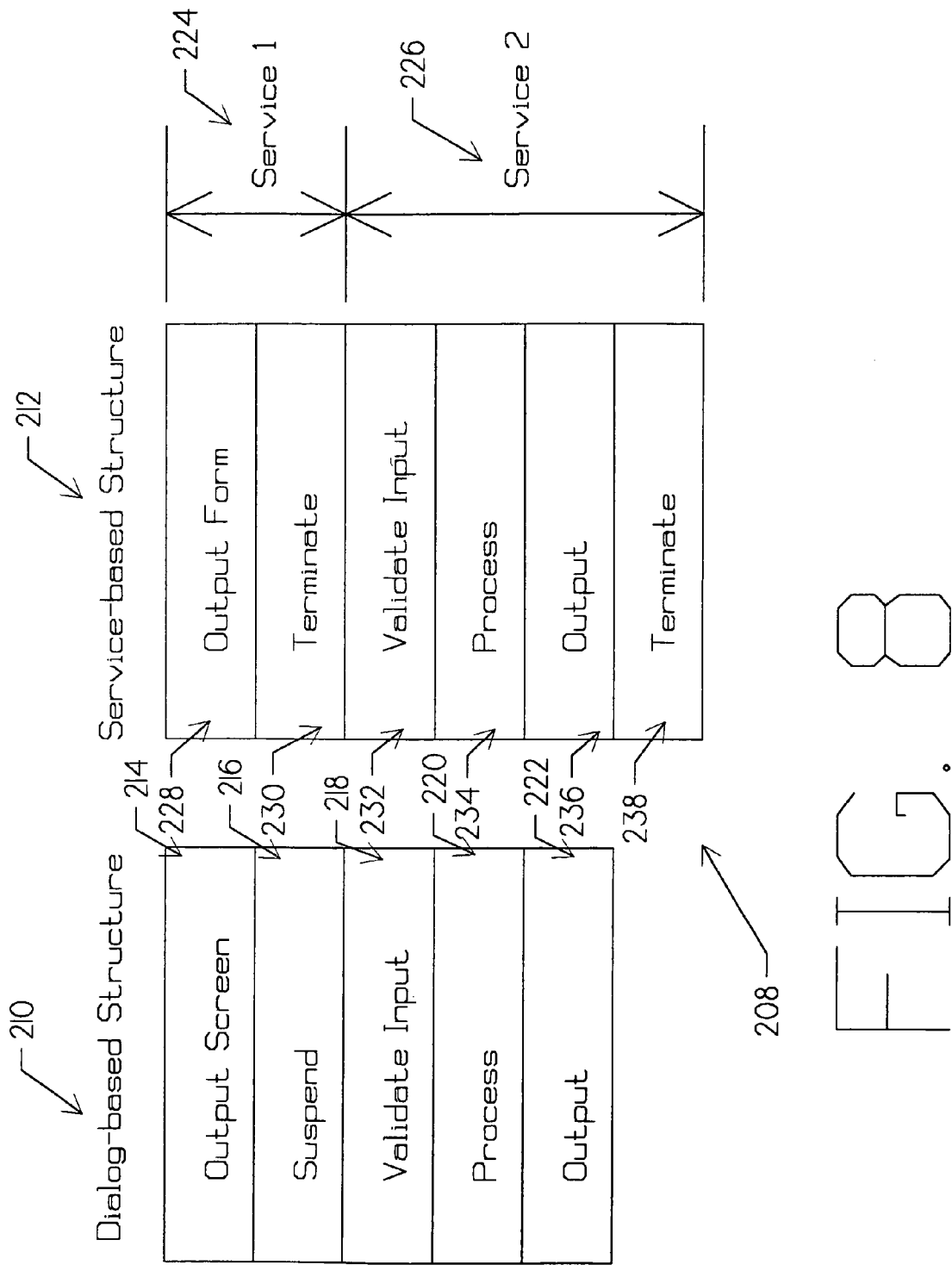
FIG. 8 is a diagrammatic comparison between a dialog-based structure and a service-based structure.

FIG. 8 is a diagram showing a comparison between dialog-based structure 210 and service-based structure 212. Dialog-based structure 210 is the norm for the typical existing proprietary data base management system (e.g., Classic MAPPER). The user, normally sitting at a dedicated user terminal, transfers output screen 214 to the data base management system to request a service. The user terminal and its normally dedicated link are suspended at element 216 to permit transfer and operation of the data base management system. The input is validated at element 218, while the user terminal and its normally dedicated link remains suspended.

The data base management system processes the service request at element 220 while the user terminal remains suspended. Output occurs at element 222 thereby releasing the suspension of the user terminal. Thus, a true dialog is effected, because one part of the dialog pair (i.e., the user terminal) is suspended awaiting response from the data base management system. This type of dialog is best accomplished in an environment wherein at least the user terminal (or data base management system) is dedicated to the dialog, along with the link between user terminal and data base management system.

Service-based structure 212 illustrates one of the basic constraints of the world wide web protocol. To ensure that each of the elements on the world wide web are sufficiently independent and to prevent one element from unduly delaying or "hanging-up" another element to which it is coupled awaiting a response, the communication protocol forces a termination after each transmission. As can be readily seen, even the simplest dialog requires at least separate and independent transactions or services. The first service, Service 224, involves the transmissions of output form 228 from the Internet user terminal. This transmission is immediately and automatically followed by termination 230 to ensure independence of the sender and receiver.

The second service, Service 226, enables the receiver of output form 228 to process the request and output an appropriate response. The validation of the input at element 232, processing 234, and output 236 all occur within the receiver of output form 228. Immediately and automatically, termination 238 follows. Thus, if Internet transactions are to be linked into a true dialog to permit data base management functions, the state must be saved from one service to the next as taught herein.

In the preferred mode of the present invention, the state of a service is saved in the repository (see also FIGS. 4 and 5) for use in the next or subsequent services.

Figure 9:
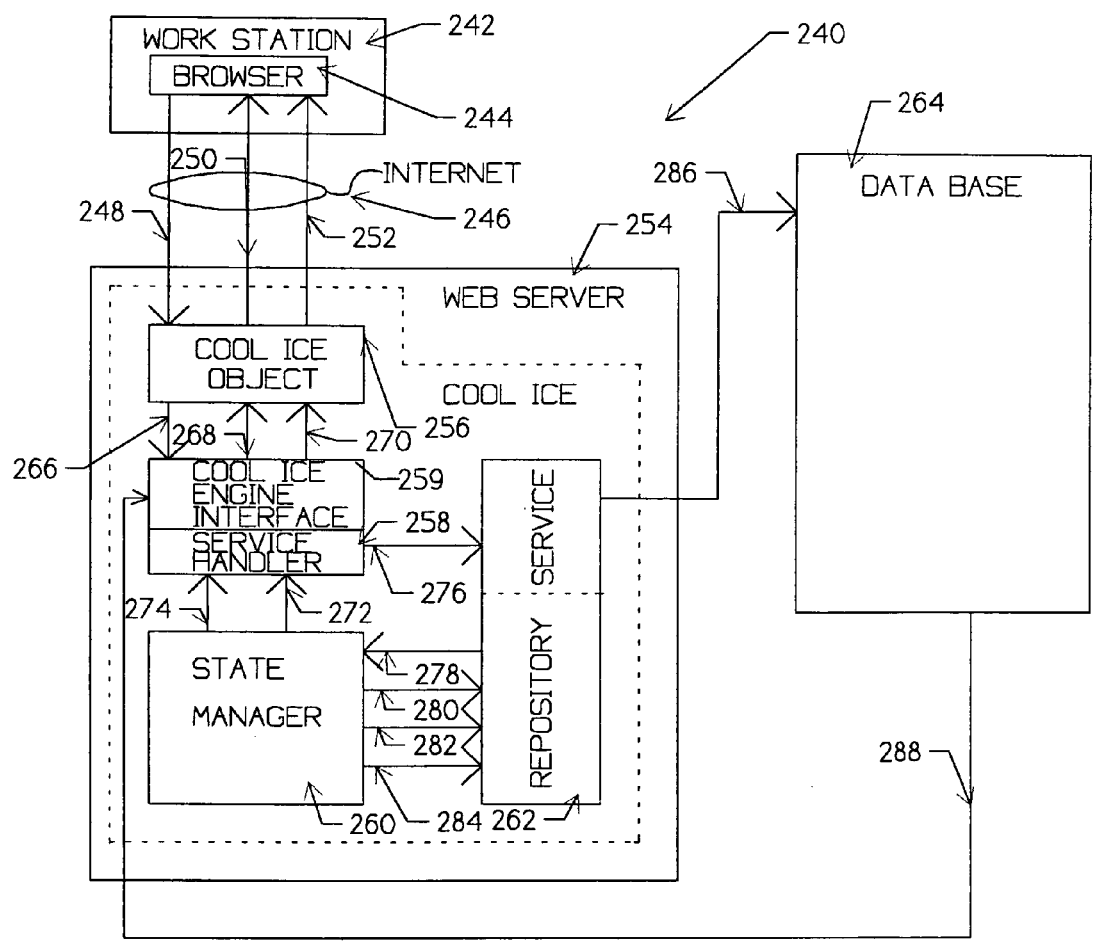
FIG. 9 is a detailed diagram of the storage and utilization of state information within the repository.

FIG. 9 is a schematic diagram 240 of the preferred mode of the present invention showing normal data flow during operation, with special attention to the state saving feature. Work station 242 is an industry compatible personal computer operating under a commonly available operating system. Browser 244 is a standard, commercially available web browser having frames capability. Path 248 is the normal world wide web path between work station 242 and web server 254 for the transfer of service requests and input data.

These transfers are converted by Cool ICE object 256 as explained above and sent to Cool ICE Engine Interface 259 for disposition.

The service request for data and/or another function is converted into the data base management language by reference to the service definition portion of repository 262 through reference along path 276. The actual command language of the data base management system is utilized over path 286 to access data base 264. The resultant data from data base 264 is transferred to Cool ICE object 256 via path 288. State manager 260 determines whether the original service request requires additional queries to data base 264 for completion of the dialog. If yes, the resultant data just received from data base 264 is transferred via path 284 to repository 262 for temporary storage, and the next query is initiated over path 286, and the process is repeated. This is the state saving pathway which is required to provide the user of the Cool ICE system to function in a dialog mode over the world wide web.

Upon receipt of the resultant data from the final query of data base 264, state manager 260 determines that the service request is now complete. State manager 260 notifies repository 262 via path 280, and the intermediate products are retrieved from temporary storage in repository 262 via path 278 and supplied to Cool ICE service handler 258 via path 272 for formatting. State manager 260 then clears the intermediate products from temporary storage in repository 262 via path 282. The final response to the service request is sent to Cool ICE object 256 via path 270 for manipulation, if necessary, and to browser 244 via path 250.

Figure 10:
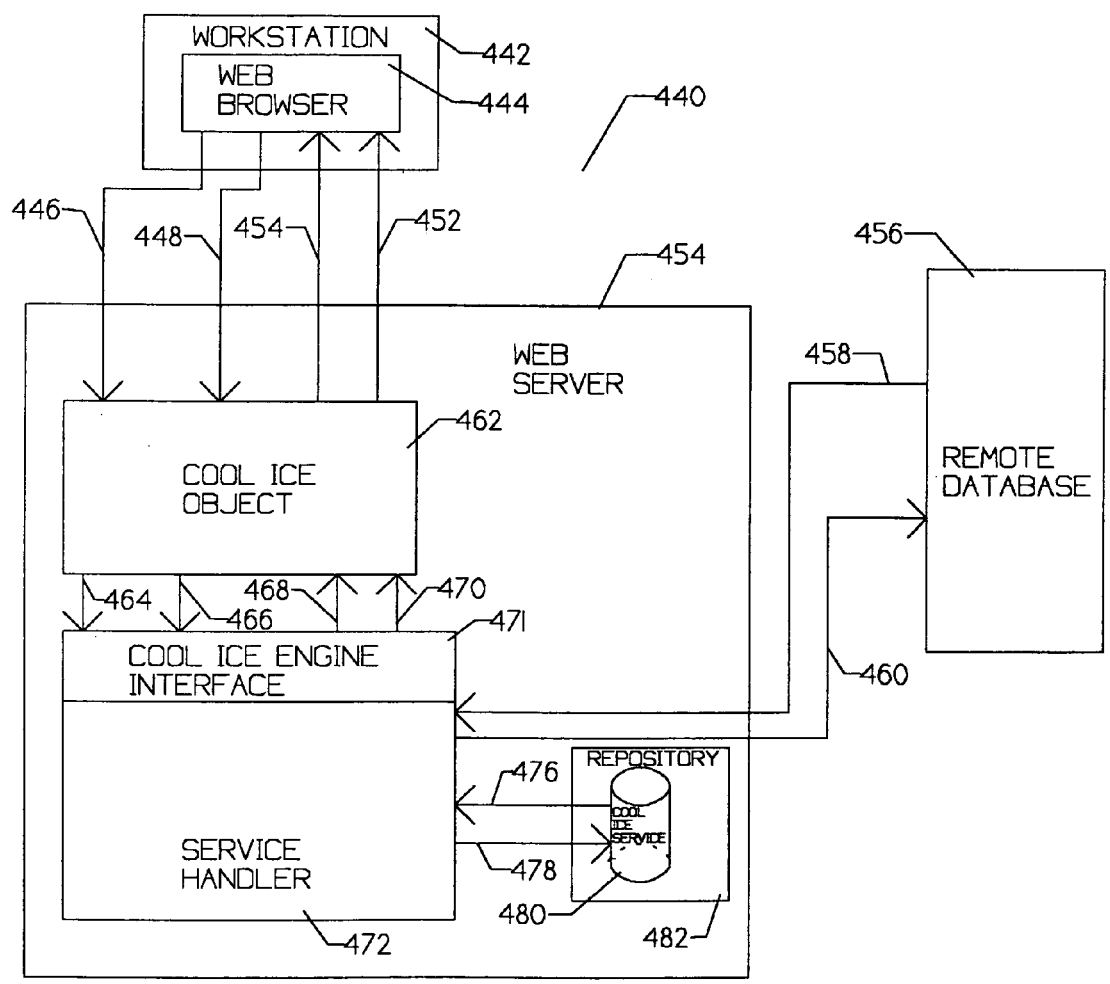
FIG. 10 is a detailed diagram showing security profile verification during a service request.

FIG. 10 is a detailed diagram 440 showing operation of the security system during the honoring of a service request. The user, operating industry compatible, personalized computer, workstation 442, formats a service requests via commercially available web browser 444. In the preferred mode of the present invention, this is accomplished by then making a call to the Cool ICE system. The user simply requests access to the Cool ICE home page by transferring web browser 444 to the URL of Cool ICE system. After the Cool ICE home page has been accessed, one of the buttons is clicked requesting a previously defined service request. For additional detail on the service request development process, see above and the above referenced commonly assigned, co-pending U.S. Patent Applications.

The service request is transferred to web server 454 via world wide web path 446. The service request is received by Cool ICE object 462 and translated for use within the Cool ICE system. The request is referred to the Cool ICE Engine Interface 471 via path 464. In the preferred mode of practicing the present invention, the Cool ICE Engine Interface 471 is equivalent to the MAPPER data base management system. The service request is passed to Cool ICE Service Handler 472 for retrieval of the command language script which describes the activities required of the data base management system to respond to the service request.

Cool ICE Service Handler 472 makes an access request of Cool ICE service portion 480 of repository 482 via path 478. It is within Cool ICE service portion 480 of repository 482 that the command language script corresponding to the service request is stored. The command language script is obtained and transferred via path 466 to service handler 472 for execution. Along with the command language script, a security profile, if any, is stored for the service request. As explained in the above referenced, commonly assigned, co-pending U.S. Patent Application, the security profile, if required, is added to the command language script file at the time of service request development by the service request developer. This security profile identifies which of the potential service requestors may actually be provided with a complete response. The security profile, if any, is similarly transferred to service handler 472 via path 476.

If no security profile has been identified for the service request, service handler 472 allows the execution of the command language script received via path 476 through access of remote database 456 via paths 458 and 460, as required. The response is transferred to Cool ICE object 462 via path 468 for conversion and transfer to workstation 442 via world wide web path 450.

However, if a security profile has been identified for the service request, service handler 462 requests the user to provide a user-id via path 470, Cool ICE object 462, and world wide web path 452. Service handler 472 awaits a response via world wide web path 448, Cool ICE object 462, and path 466. Service handler 472 compares the user-id received to the security profile stored with the command language script. If the user matches the security profile, access is granted and service handler 472 proceeds as described above. If the user does not match with the stored security profile, the service request is not executed and the user is notified via an appropriate message.

Figure 11:
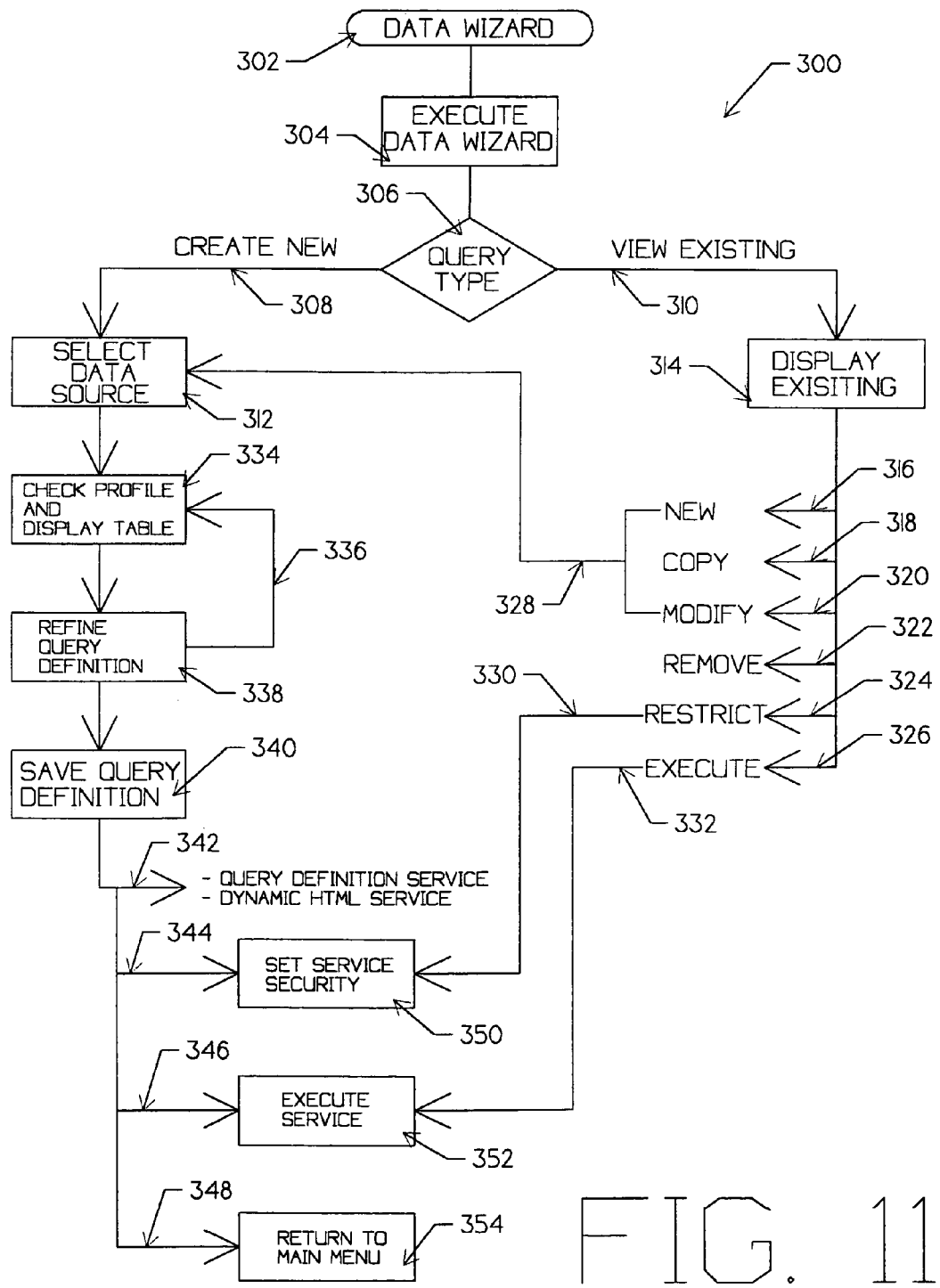
FIG. 11 is a flow diagram showing the operation of the Cool ICE Data Wizard.

FIG. 11 is a detailed flowchart 300 showing the process for authoring a Cool ICE service in SQL utilizing the data wizard. Entry is made at element 302. This is accomplished by the user who enters from the data wizard request on the user's standard browser. The user actually clicks on the data wizard button of the Cool ICE home page, which appears if the user-id indicates that the user is to have service development access to Cool ICE. This causes an HTML page to be transmitted to the Cool ICE system requesting the initiation of the data wizard script writing tool. The HTML page also indicates whether the request is to create a new Cool ICE service or to review (and possibly modify, copy, etc.) an existing Cool ICE service.

If the request is to create a new Cool ICE service as determined by element 306, control is given via path 308 to element 312 for selection of the data source. This data source may be co-located with the Cool ICE system or may reside at some remote location. Though it is transparent to the user whether the data is co-located, it involves additional scripting to fetch data from a remote location. Cool ICE supports local databases ODBC (CORE level, 32-bit), Oracle, Sybase, Microsoft SQL, and Unisys MAPPER Query Language. Cool ICE supports remote databases Microsoft SQL, Informix, ODBC (CORE level, 32-bit drivers), Oracle, Sybase, Ingres, Unisys MAPPER Query Language, Unisys Relational Database Management System (RDMS), and Unisys A Series Query Language (ASQL). Up to five different data bases may be utilized through the use of the JOIN TABLES option.

The security profile is checked and verified at element 334. As discussed more fully in the above identified co-pending applications, this security profile can specify access to a database, a table, or even an individual column of data within a table (see also FIG. 13). Element 338 refines the data base management system query to be used. At that point, the security profile may need to be reverified and control may be returned to element 334 via path 336. This iterative verification of the security profile is necessary as the query is refined, because the refining process may indicate other data elements which must be accessed. Of course, this reverification is most likely if the governing security profile specifies access to only individual columns within a table. After the security has been completely verified, element 334 creates and displays a table from the specified data sources. A more complete description concerning the refining process is found below in reference to FIG. 12.

The completed query is a sequence of command statements scripted in the SQL language, Cool ICE script, or a combination involving Cool ICE reports stored in the repository. It defines all of the data base management system functions which must be executed to properly respond to the to service request made by the user at the Internet terminal. This completed query is saved in the repository (see above) by element 340. The query may be saved as both a query definition service and as a dynamic HTML service along path 342 Thus the completed service may be easily called for subsequent use.

Following saving of the completed query definition, path 344 permits element 350 to set a security profile for the service just defined. This security profile specifies which user-id(s) may access this service. The service will not appear on the Cool ICE main menu or on the data wizard service list for any user-id not thus specified as a user of the service. The security profile for a given user may be changed subsequently as described below in more detail.

Path 346 permits execution of a selected query service at element 352. The user may exit data wizard at element 354 via path 348.

When element 306 determines that an initial user request is to view an existing query definition, path 310 provides control to element 314. If the user-id of the requestor matches with the security profile of the exiting query definition, element 314 displays the query definition by formatting and transmitting an HTML screen to the user Internet terminal. As explained above, the security profile given to the existing query definition, if any, will determine whether it will even appear on the user menu. The user is then given the option via a menu selection of one of paths 316, 318, 320, 322, 324, or 326.

Path 316 permits creation of a new query definition. Path 318 provides for copying of an existing query definition. Path 320 produces opportunity to modify an existing query definition. In each of these three cases, path 328 gives control to element 312 for creation or modification of the query definition in accordance with the process described above.

Path 322 provides for removal of the query definition. In this instance, an obsolete query definition may be erased from the repository.

Path 324 is available to change the security profile for a given selected query definition. Control is given to element 350 via path 330 and the security profile is modified as discussed above. Path 326 gives the user the opportunity to execute an existing query definition. Element 352 receives control from path 332 and executes the existing query definition as discussed above.

Figure 12:
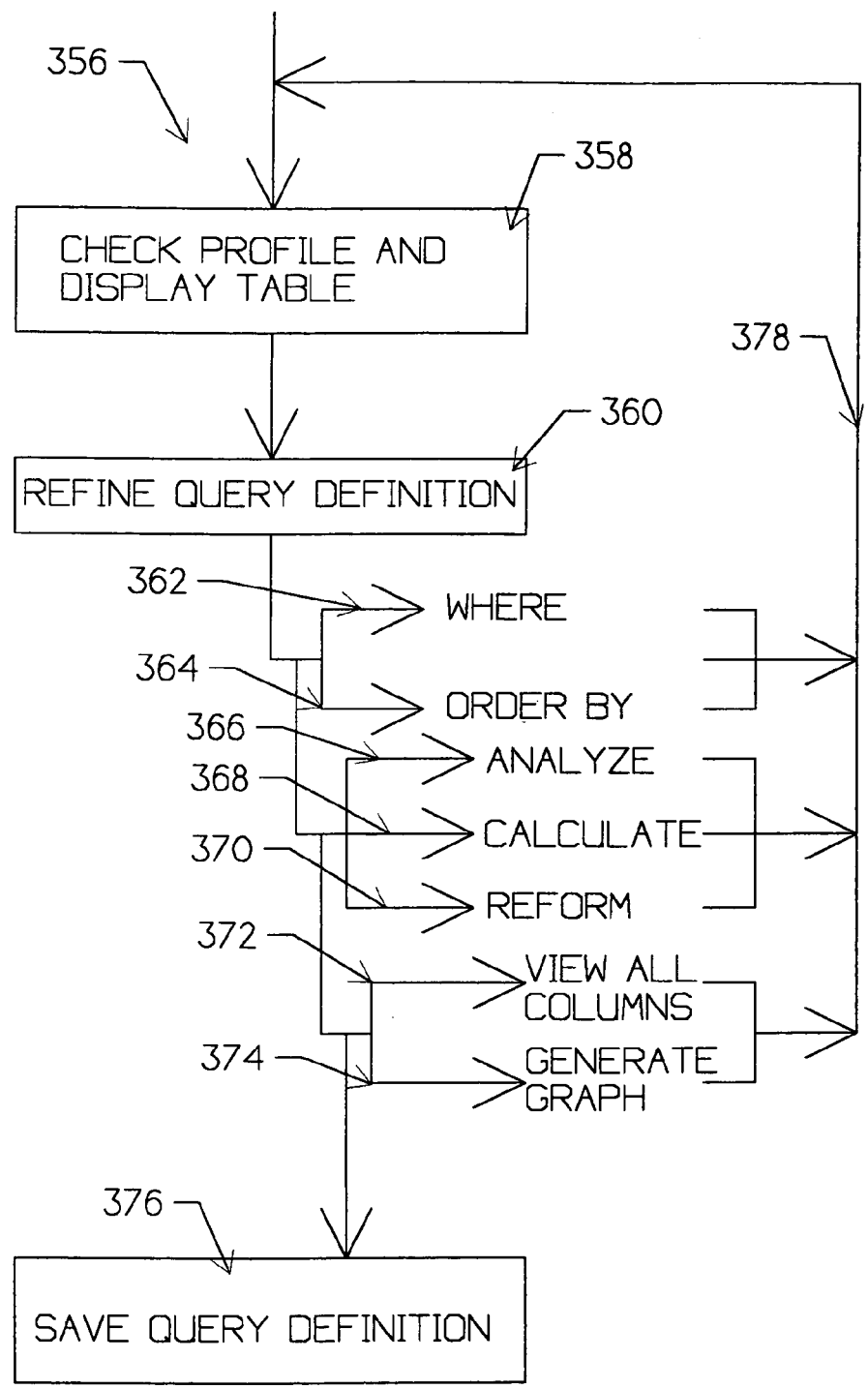
FIG. 12 is a detailed flow diagram showing the basic Data Wizard functions.

FIG. 12 is a detailed diagram 356 of the query definition refining process wherein elements 358, 360, 376, and 378 correspond to elements 334, 338, 340, and 336, respectively, of FIG. 11 Upon presentation of the selected data sources table, the query definition may be refined at element 3608. The options available are:

1. add a where clause that defines up to five conditions for retrieving data from the report or table along path 362 or an order by clause along path 364;
2. Sort the table or report according to the data in up to five columns;
3. Analyze and summarize selected data in the report or table via path 366. For each column a total value, average the data, select a minimum column value, or select a maximum column value may be computed.
4. Perform calculations on the data via path 368. The data wizard can compute, compare, and replace numeric data, character strings, dates, and times in selected columns.
5. Reformat or define how the selected data appears when the Cool ICE service for this query definition is executed via path 370. Using the reformat option enables definition of the column order, field size, and column headings.
6. Create a graph of the data via path 374. The definition of the graph may be saved as part of the query definition.

Basically, refining a query definition is a three-step process. The three steps are: where and order by; analyze, calculate, and reformat; and create a graph or selectively view any or all columns. The user simply makes the selections on the user menu and clicks on the desired result. The data wizard applies the specific refining action and redisplays the resultant screen.

Figure 13:
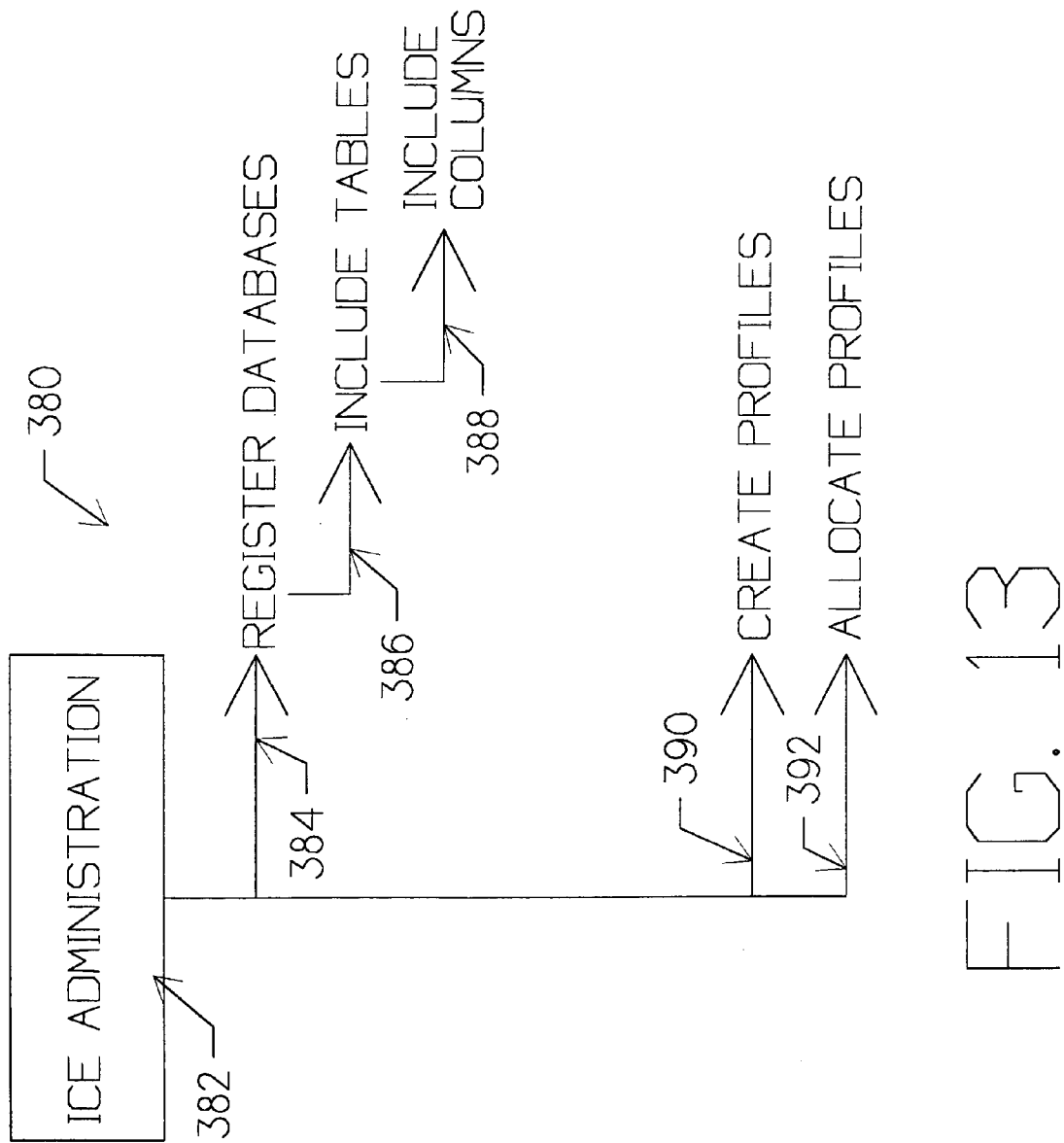
FIG. 13 is a flow diagram showing the role of the Cool ICE Administration module.

FIG. 13 is a detailed flow diagram 380 of the functions performed by the Cool ICE administration module (see also FIGS. 4, 5, and 9) for query definition. The primary responsibility of Cool ICE administration module 382 is to register with the required local and remote data bases needed for the query definition. Path 384 provides for such registration.

In order for registration to take place, Cool ICE administration prompts the user with one or more HTML screens for entry of the data needed to identify and register the data bases. For each data base to be utilized, the user must supply information such as the TCP/IP address, data base type (e.g., ODBC, MQL, etc.), user-id, user password, and logical name for this data source within Cool ICE. Access to a particular data base may be for the entire data base as with path 384, only specified tables within the data base as with path 386, or only with specified columns with specified tables within the data base as with path 388. In each instance, the user-id and user password supplied must correspond to the access specified.

Path 390 permits the user to create a security profile for the query definition. It is axiomatic that the user can define a security profile which is more restrictive than the user's own security profile, but cannot define a less restrictive profile. As with all Cool ICE security profiles, access may be granted by entire data base, by select tables within the data base, or by select columns within select tables within the data base.

Security profiles are allocated to individual users via path 392. In a typical application, certain employees might have access to the query definition and all of the resulting response, whereas others may have access to the query definition but have access to only a portion (by table and/or column) of the resulting response. Yet others would be denied any access.

Figure 14:
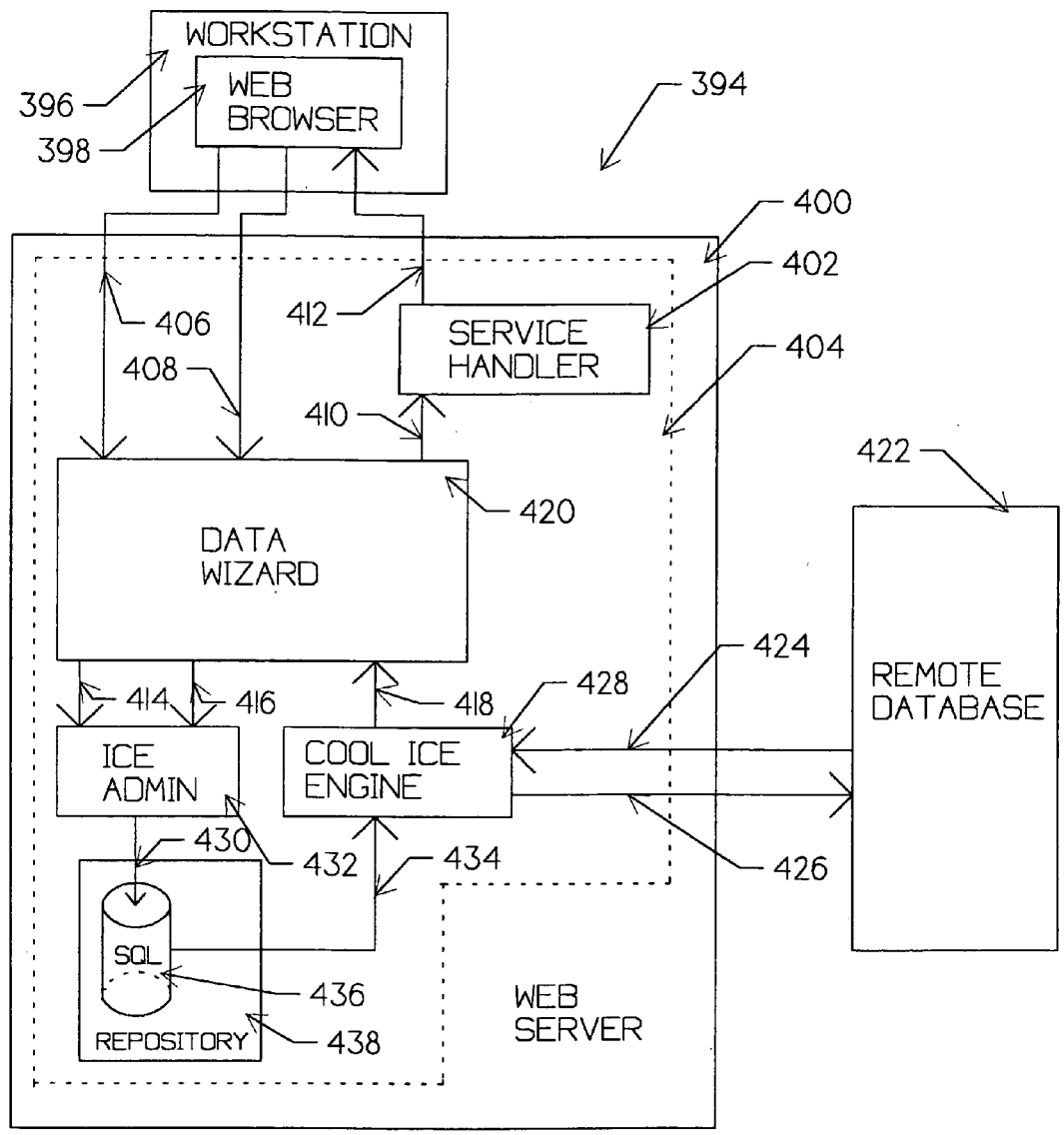
FIG. 14 is a diagram showing utilization of the Cool ICE Data Wizard.

FIG. 14 is a detailed schematic diagram 394 of query definition using the data wizard. The user, at Internet workstation 396, activates commercially available world wide web browser 398 and accesses the Cool ICE homepage via world wide web paths 406, 408, and 412 using the previously defined URL. The Cool ICE homepage has a button for calling data wizard 420 for query definition.

Cool ICE data wizard 420 determines the nature of the service request (see also FIG. 11) and begins processing. Paths 414 and 416 enable Cool ICE administration module 432 to register the required data bases (see also FIG. 13). The resulting SQL script generated by data wizard 420 is transferred to repository 438 via path 430 for storage at query definition storage area 436.

Execution of an existing data wizard scripted query definition is accomplished by Cool ICE engine 428 which is essentially the MAPPER data base management system in the preferred mode of the present invention. The script is accessed from storage and transferred to Cool ICE engine 428 via path 434. Accesses to remote database(s) 422 is via world wide web paths 424 and 426.

The resultant report produced by execution of the query definition script is transferred to data wizard 420 via path 418 for formatting. The response is then transferred to service handler 402 via path 410 for transfer via world wide web path 412 as an HTML page which is presented to the user on workstation 396.

Figure 15:
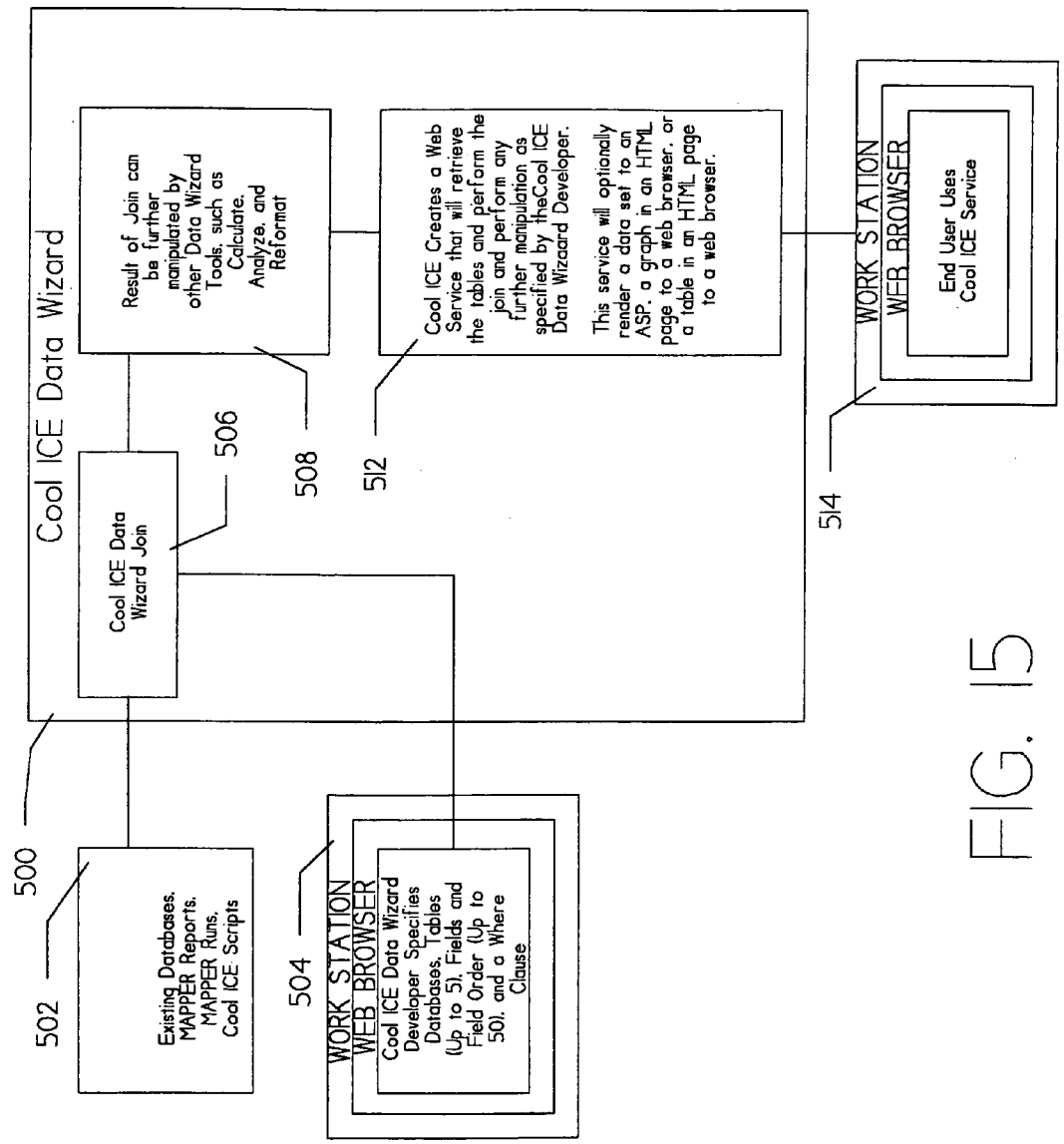
FIG. 15 is a flow diagram showing operation of the Data Wizard Join Service.

FIG. 15 is a flow diagram showing operation of the Join Service within Cool ICE Data Wizard 500. At element 504, the developer specifies up to five tables, up to fifty fields, and a defining where clause. These definitions are provided to Cool ICE Data Wizard Join 506. The joined resulting data is provided to element 508 to permit other data wizard operations. The output is produced at element 512. The End user has the joined and formatted data available at element 514.

Figure 16:
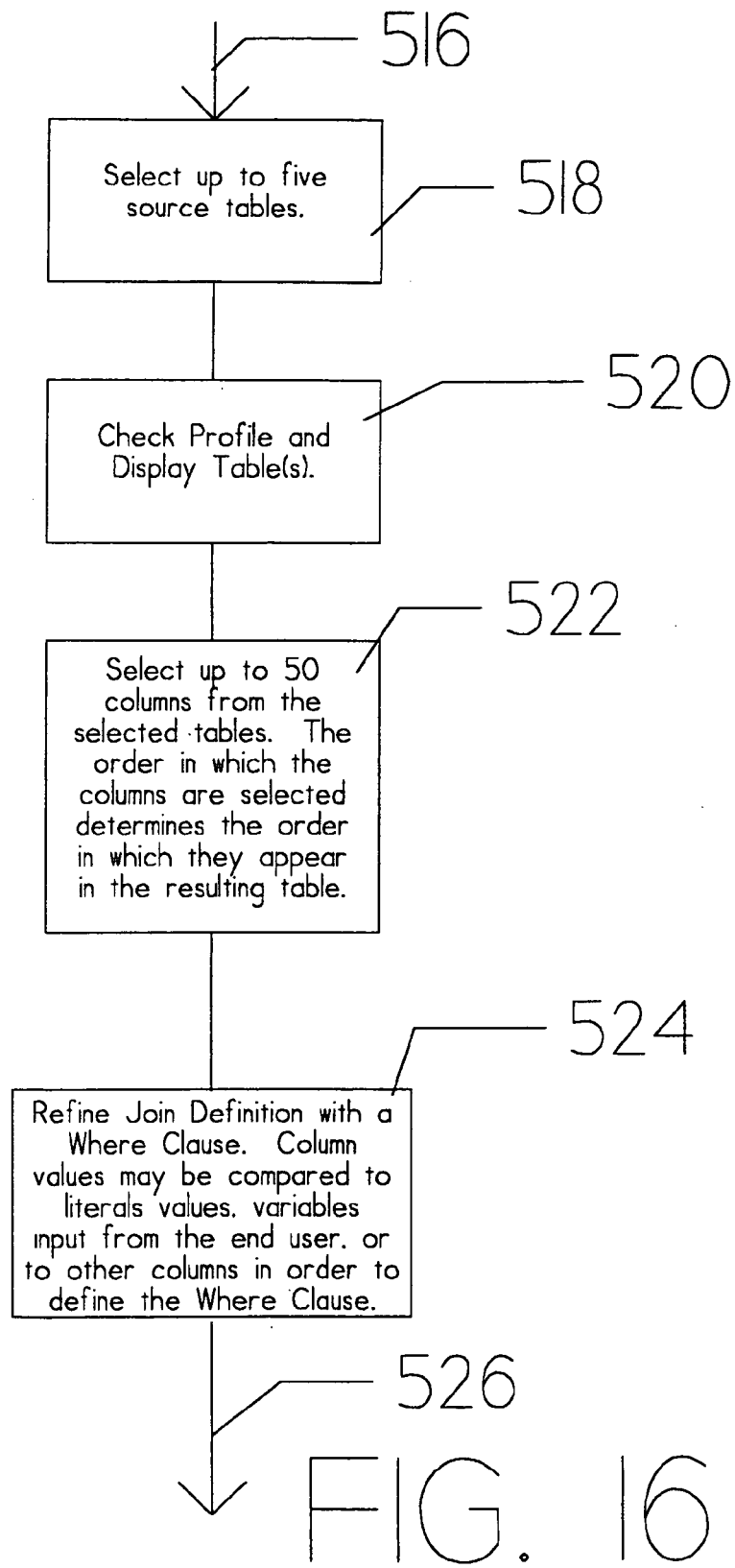
FIG. 16 is a detailed flow diagram for Join Service.

FIG. 16 is a detailed flow chart showing the operation of the join service. Entry is via path 516 which corresponds to the output of select data source 312 (see also FIG. 11). Up to five tables are selected by the user at element 518. Element 520 checks and displays the selected tables. The join functions are performed at elements 522 and 524 as shown. Path 526 returns control to element 338 (see FIG. 11). In accordance with the preferred mode of the present invention, the data bases in the following formats may be joined with the Cool ICE Data Wizard Join Service:

ODBC;
RDMS (HMP/IX);
RDMS (HMP/IX) UniAccess ODBC;
DMS HMP/IX INFOAccess32 OCBC (level 3.2 or 3.3);
DMS II HMP/NX—InfoAccess32 ODBC (level 4.2);
Oracle;
Microsoft SQL Server;
Sybase Adaptive Server;
Informix; and
Ingres.

Figure 17:
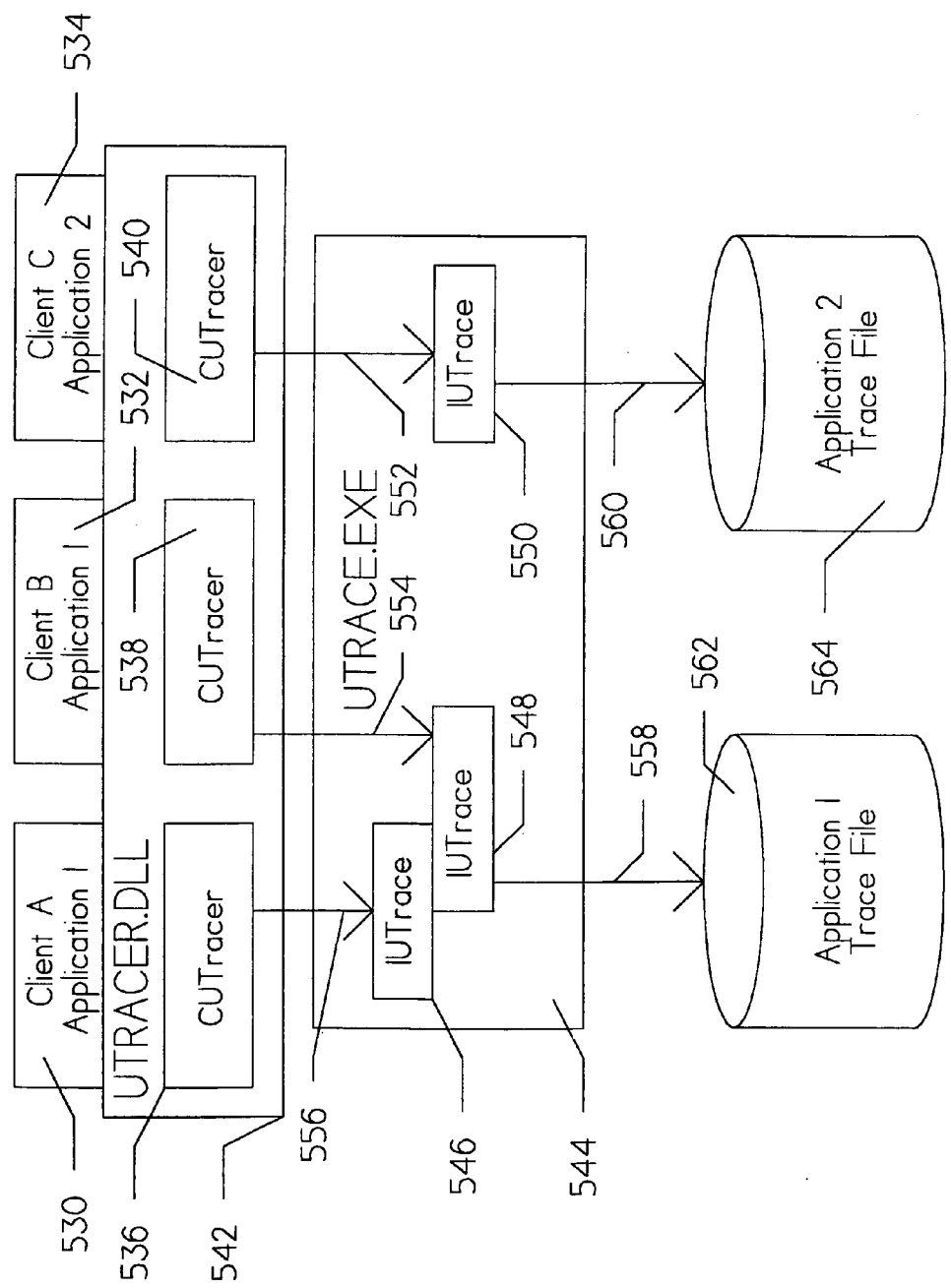
FIG. 17 is a detailed flow diagram of the Utrace architecture.

FIG. 17 is a detailed flow diagram of the Utrace Architecture. A client, such as Client A (Application 1) 530, Client B (Application 1) 532, and Client C (Application 2) 534 requests tracing services through UTRACER.DLL 542. The client calls a method from CUTracer 536, CUTracer 538, or CUTracer 540 to explicitly turn on tracing, unless the tracing is implicitly turned on when the CUTracer object reads the trace registry settings for the component.

The activated CUTracer class instantiates an instance of the Utrace COM object, and based on information from the client, sets client specific properties in the component. The client also sets properties of the trace helper class to assist in automatic formatting trace messages. The client builds up a trace message using the CUTracer class, and then calls on a method to send the message.

The CUTracer class does formatting as determined by its properties, and then invokes one of the IUTrace interface methods (i.e., IUTrace 546, IUTrace 548, or IUTrace 550) from ULTRACE.EXE 544 to trace the message. The Utrace component then writes a line of trace information to the trace file (i.e., Application 1 Trace File 562 for application 1 or Application 2 Trace File 564 for application 2). The activities of the trace session (i.e., trace file open, information gathering, and trace file close) are under the direction of the application.

FIG. 18 is a table 565 showing the various registry settings in accordance with the preferred mode of the present invention.

Figure 19:
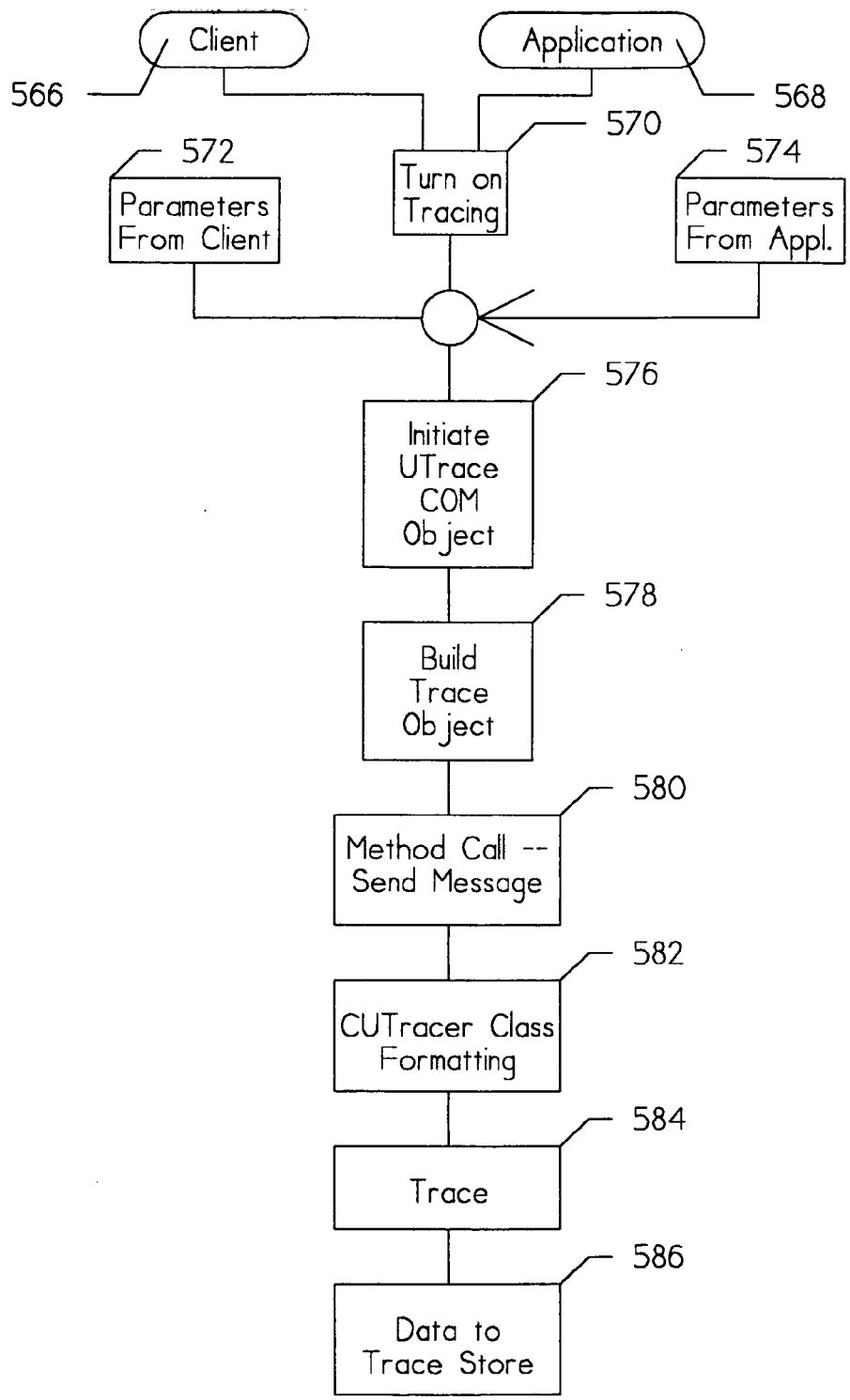
FIG. 19 is a flow chart showing the generic trace process.

FIG. 19 is a flow chart showing the generic trace process. Tracing may be initiated manually by client 566 or automatically by application 568. In either situation, element 570 turns on the trace process. Parameters for the tracing process may be supplied by both the client, via element 572, and by the application, via element 574.

Element 576 initiates the UTrace COM object (see also FIG. 17). The specific trace object is built at element 578. Element 580 sends the method call message, and element 582 prepares the class generic formatting. The actual trace is performed at element 584. The trace data is stored at element 586.

FIG. 20A is a table showing the definitions for policy trace flags which are stored in a registry value. In addition, the application may define its own set of policy flags that are more appropriate for that application. Through registry settings, the policy may apply to all components of the application. Alternatively, different policy settings may be applied to different components. These policy settings are stored in a corresponding registry key.

FIG. 20B is a table showing a typical run-time call. Upon encountering this script, the policy for the component is queried for the CI_TRACE_DETAIL policy flag to see if the tracing should actually occur.

Figure 21:
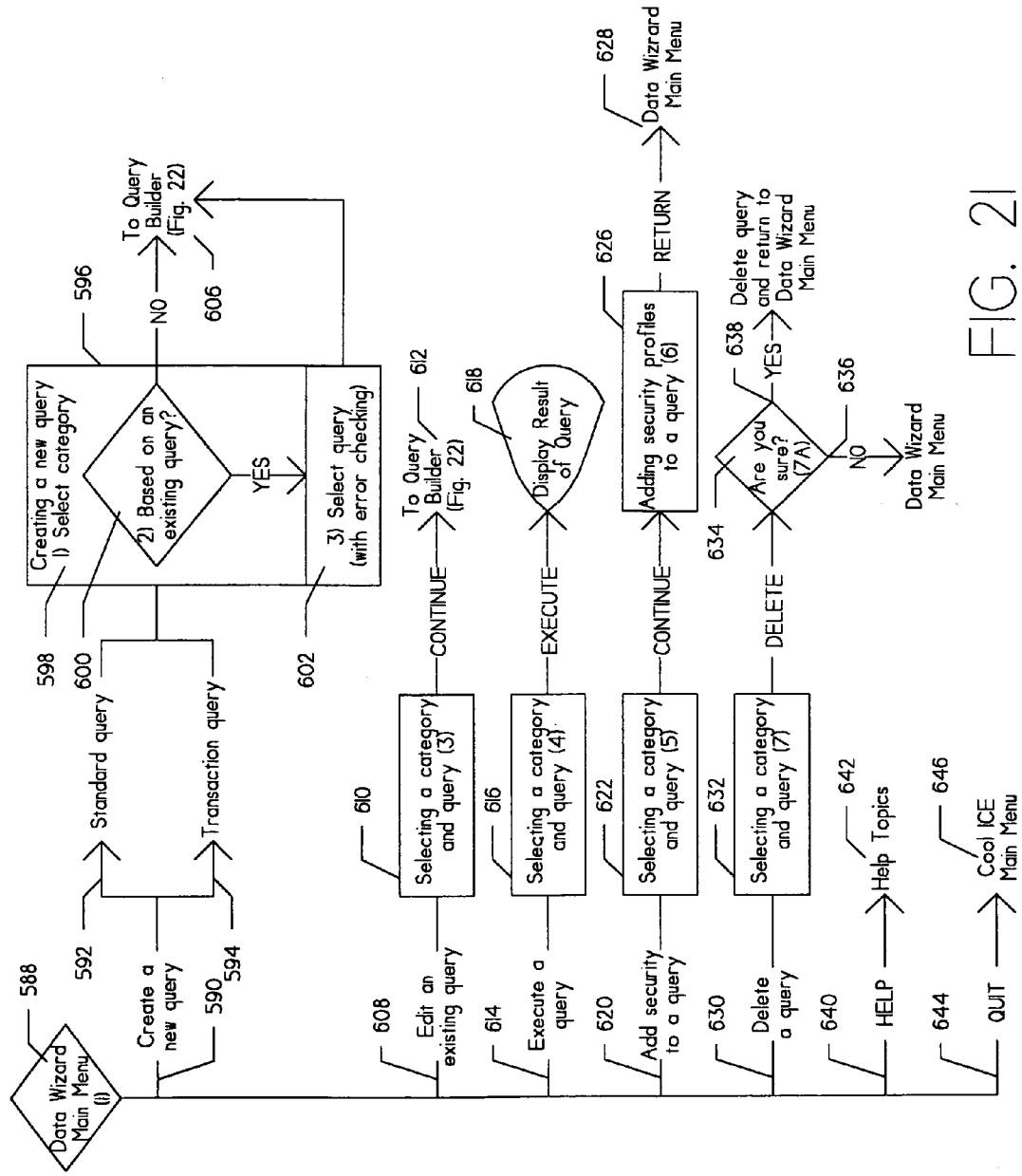
FIG. 21 is a detailed flow chart showing branching from the Data Wizard Main Menu.

FIG. 21 is a detailed flow chart showing branching from the Data Wizard Main Menu. The user interface process begins with Data Wizard Main Menu 588. A first possible user selection is branch 590 which is used to create a new query. The major division for new queries is via path 592 for a standard query or via path 594 for a transaction query. Element 598 of processor 596 selects the appropriate category. Whether the new query is based upon a previous query is determined by element 500. If no, control is given to the Query Builder at element 606. Otherwise, control is first given to element 602 for selection of the query, before element 606 sends the query request to the Query Builder.

Branch 608 corresponds to the request to edit an existing query. The category is selected at element 610. The process continues by passing control to the query builder at element 612.

Execution of a query cause branching to path 614. Element 616 provides for selection of a category. Execution and display at element 618 follows.

Element 620 provides a path for adding security to a query. A category is selected at element 622. The appropriate security profile(s) is added at element 626 and control is returned to Data Wizard 588 via element 628.

Branch 630 provides the path to delete a query. The category is selected at element 632. The user is given an opportunity to affirm the deletion decision at element 634. If the user changes his/her mind, path 636 returns control to Data Wizard Main Menu 588. Otherwise element 628 deletes the query before returning control to element 588.

Help information is provided via path 640 which exits to help topics at element 642. Branch 644 permits exiting the data wizard. Element 646 gives control to Cool ICE Main Menu.

Figure 22A:
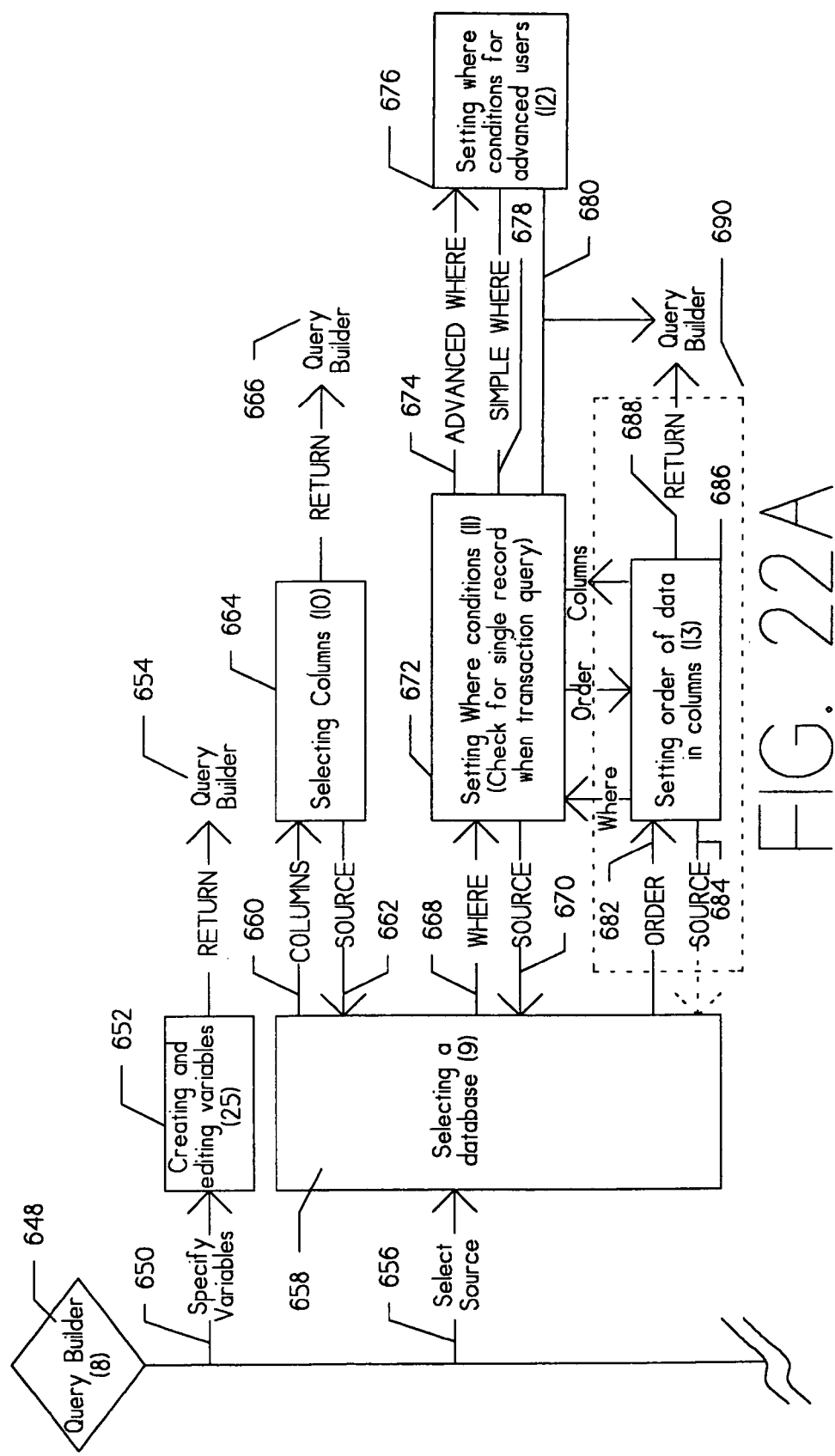
FIG. 22, consisting of FIG. 22A, FIG. 22B, and FIG. 22C, is a detailed flow chart showing operation of the Query Builder.
Figure 22B:
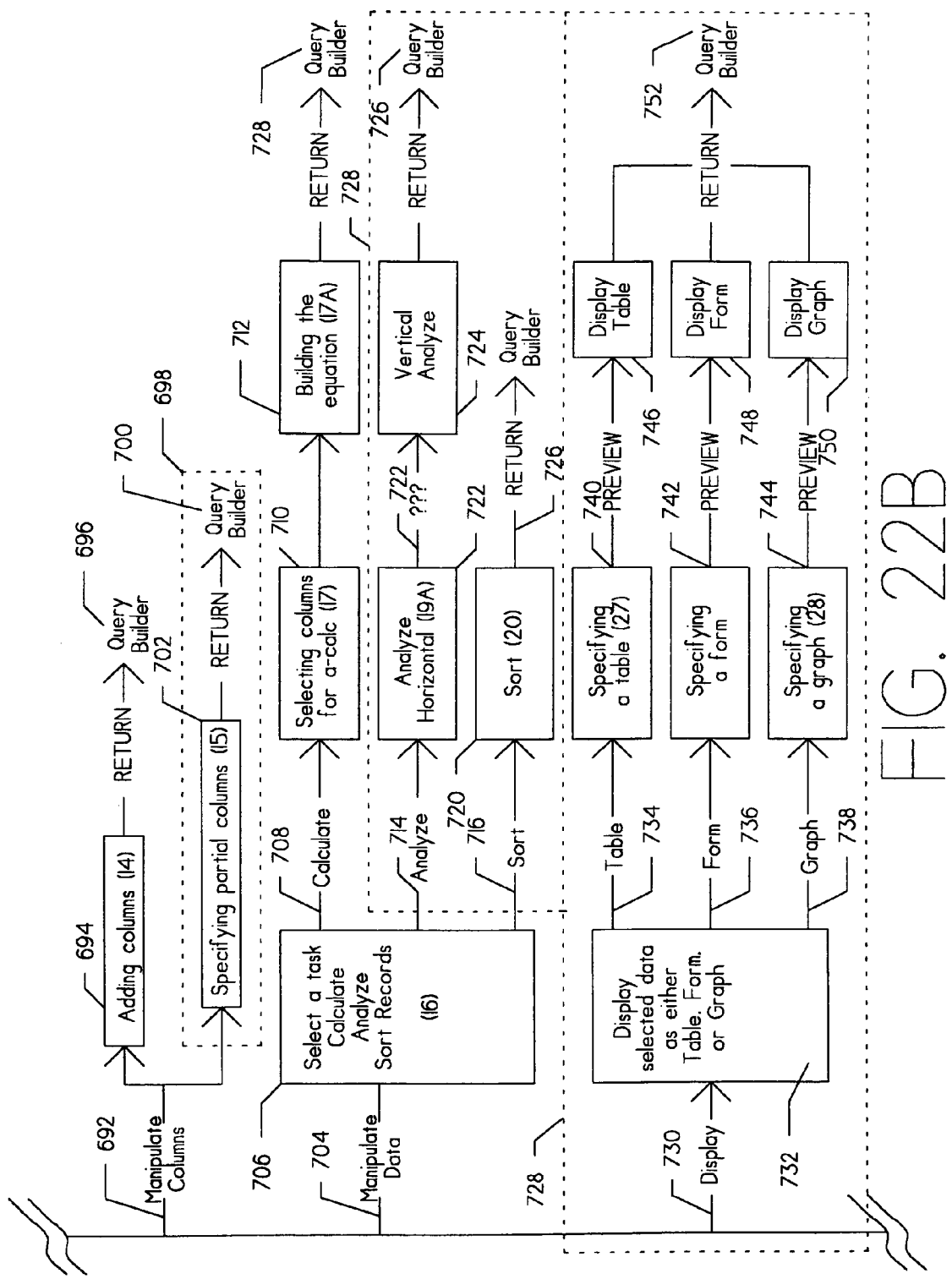
Figure 22C:
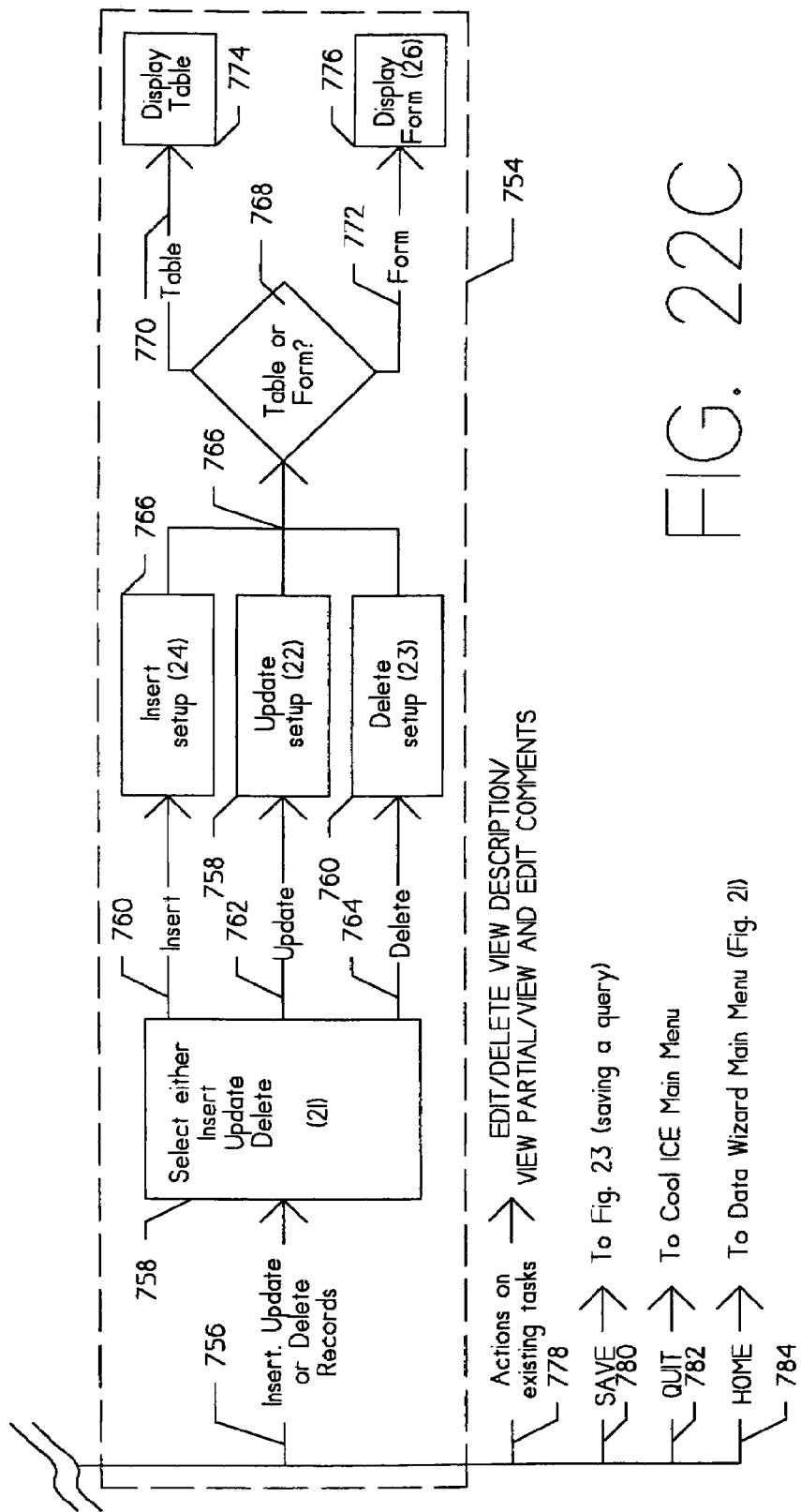

FIG. 22 is a detailed flow chart of the process of building a query. Element 648 provides the entry to the query builder. Path 650 permits specification of the variables. Control is returned to query builder 648 via element 654. Path 656 provides for selection of the source(s) of the components for construction of the customized user interface. Database selection is via element 658. Element 664 provides for selection of columns via path 660 with source returned via path 662. Return to Query Builder 648 is via element 666.

Where is selected at element 672 and order is selected at element 686. Paths 668 and 682 specify where and order, respectively. Source is returned via paths 670 and 684. Elements 672 and 686 exchange where, order, and column information, as shown. Advanced where operations are transferred via path 674 to element 676 with simple where communicated via path 678. Paths 680 and 688 return control to Query Builder 648. Operations 690 are not applicable to transaction queries.

Manipulation of columns is accomplished via path 692. Columns are added via element 694 with element 696 returning control to Query Builder 648. Operations 698 are not applicable to transaction queries. Element 702 specifies partial columns. Control is returned to Query Builder 648 via element 700.

Data manipulation is accomplished along path 704. Element 706 provides for selection of tasks for calculation (via path 708), analysis (via path 714), and sorting (via path 716). The columns for calculation are selected via element 710. Element 712 builds the equation(s) to accomplish the calculation before control is returned via element 728. The remainder of the data manipulation functions (i.e., operations 726) are applicable only to standard queries. Horizontal and vertical analysis are via elements 722 and 724, respectively, whereas element 720 sorts the records. Returns occur via paths 728 and 726.

All of operations 728 involving display from path 730, are applicable only to standard queries. Element 732 selects table (i.e., path 734), form (i.e., path 736), and graph (i.e., path 738). Specification of table, form, and graph are by elements 740, 742, and 744, respectively. Similarly, elements 746, 748, and 750 actually display table, form, and graph, respectively. Return is via element 752.

Operations 754 are applicable only to transaction queries. Path 756 provides for insertion, updating, and deletion of records. Element 758 makes the appropriate selection. Paths 760, 762, and 764 direct control to elements 756, 758, and 760 for insertion, updating, and deletion. Paths 766 direct control to switch 768, which directs tables via path 770 for display at element 774, and which directs forms via path 772 to element 776 for display.

FIG. 23 is a detailed flow chart showing conclusion of the process. Entry is via path 786. Element 788 examines the query. Comments are sent to display 792 with responses returned via path 794. Path 796 continues. Element 798 saves the query definition. Element 800 deals only with transaction queries. Conclusion is via path 802, with return to Data Wizard Main Menu via element 804.

Figure 24:
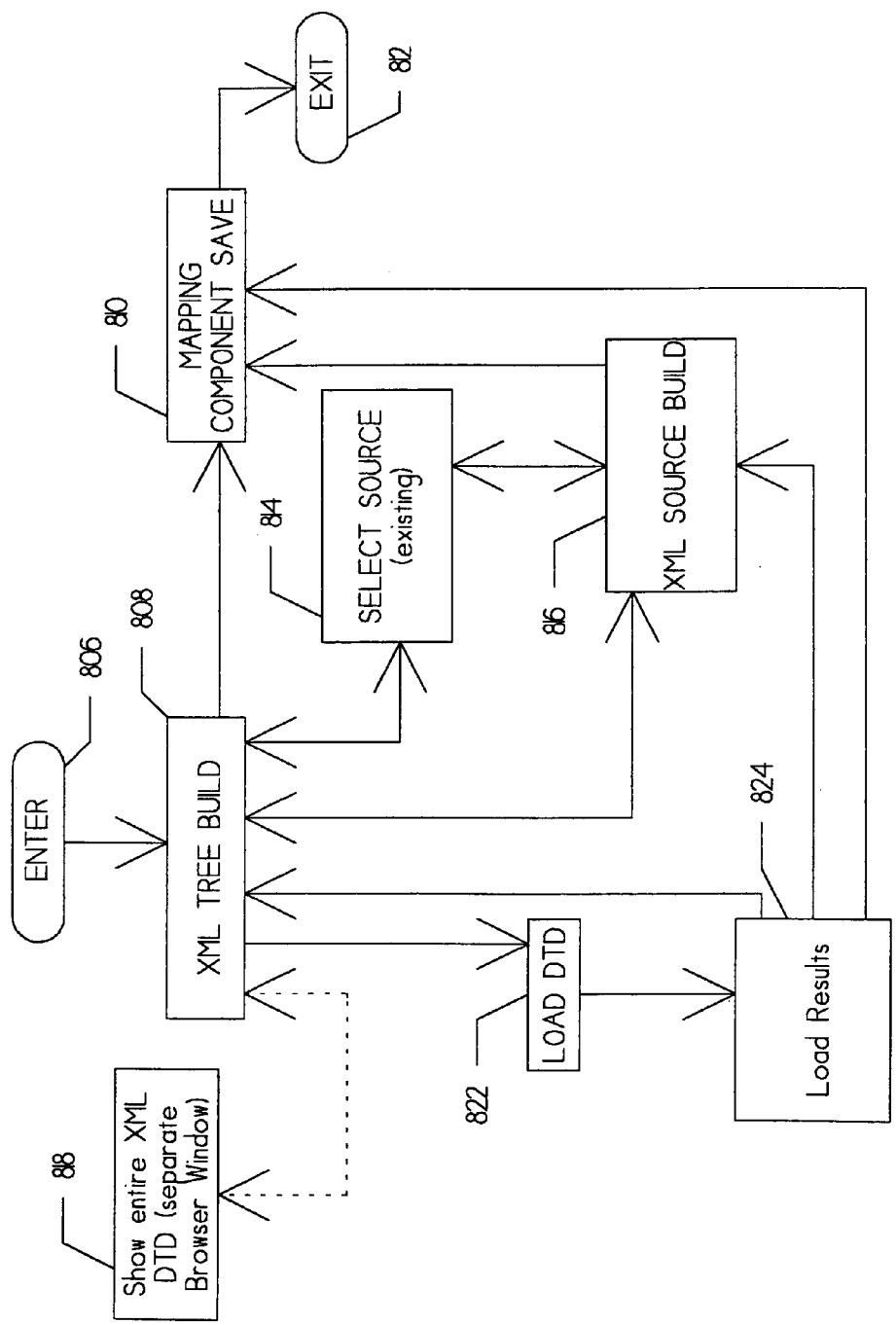
FIG. 24 is a detailed diagram showing the operation of the key elements of the present invention.

FIG. 24 is a detailed flow diagram showing the operation of the key components of the Component Builder of the present invention. Entry is via element 806. Element 808 provides for building of the XML source mapping tree. Generally the overall tree structure is defined through iterative modifications.

A typical way of defining the XML element to source mapping tree structure is via loading a Document Type Definition (DTD). The DTD is loaded using element 822. The tree structure built may be simply returned to XML tree build 808, XML source build 816, or mapping component save 810.

Once the basic tree structure is in place, XML tree build 808 begins populating the tree. Selection of an existing source structure is performed via element 814. XML source build is done via element 816.

Element 810 provides the user with the opportunity to save the XML mapping component for further use. This is ordinarily accomplished before exit at element 812, as shown. Element 818 permits the XML DTD to be displayed via a separate browser window.

Figure 25:
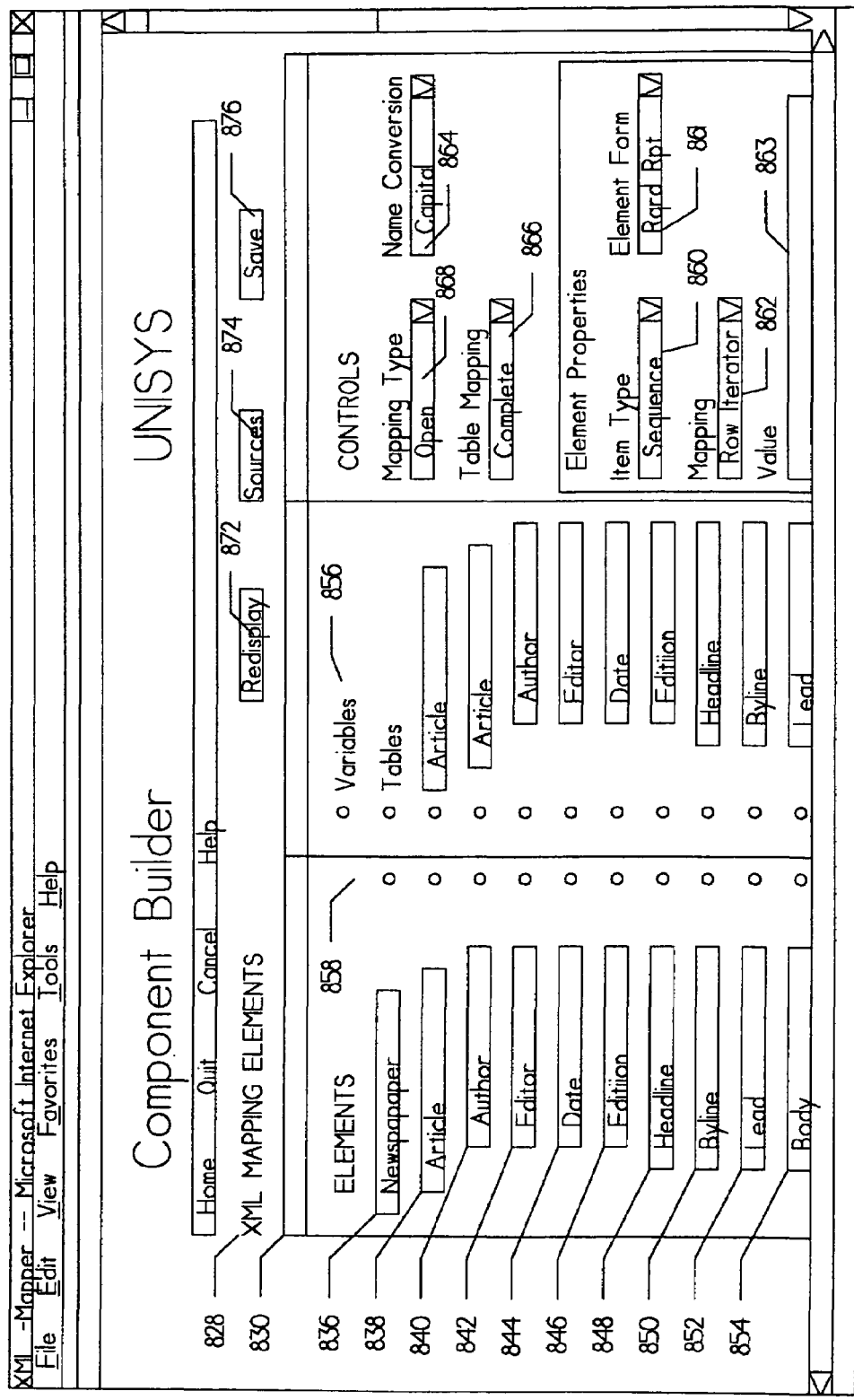
FIG. 25 is a top view of the primary window for the Component Builder showing presentation of the XML mapping tree.
Figure 26:
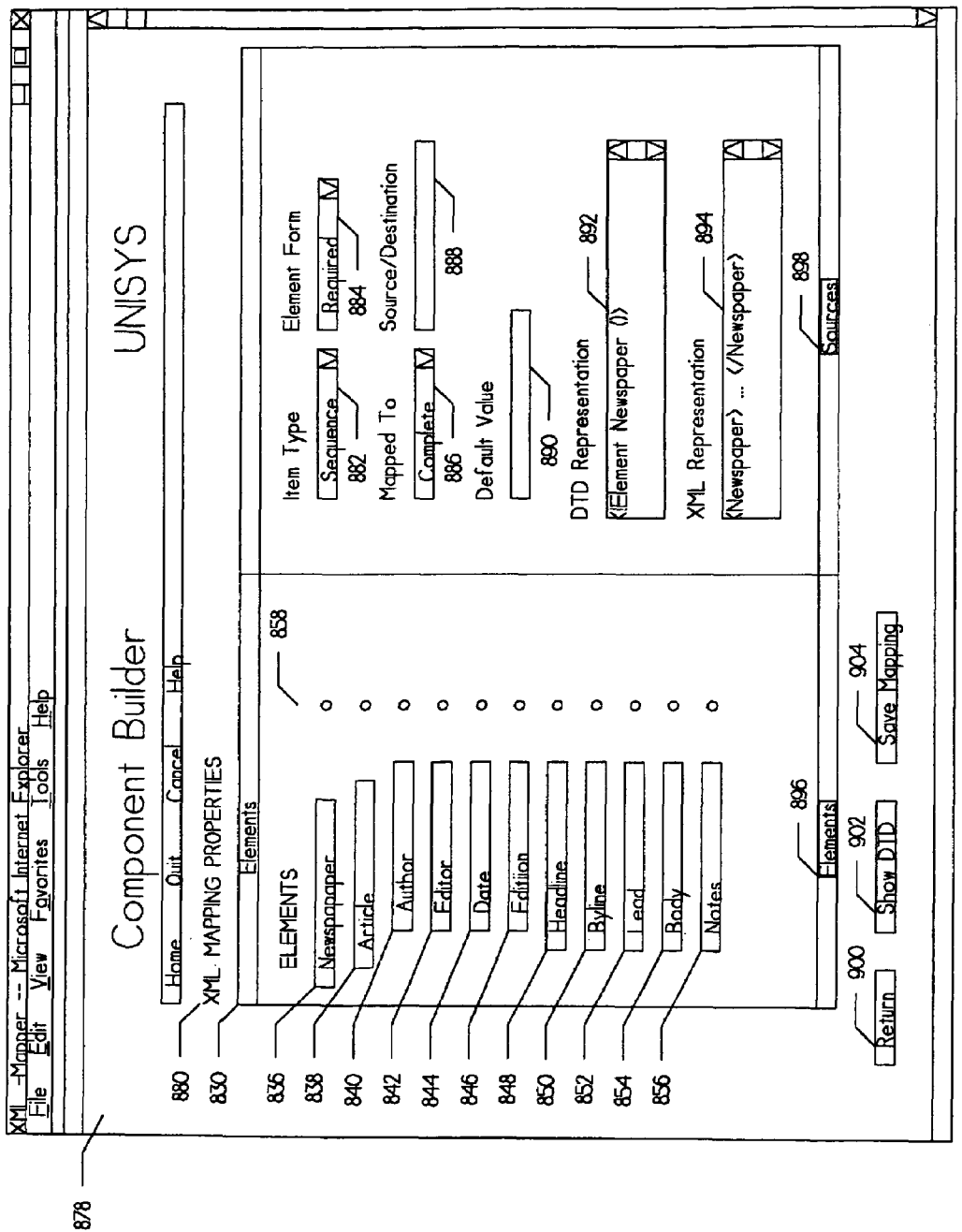
FIG. 26 is a scroll down view of the screen of FIG. 25.

FIG. 25 is a lead view of window 826 which is the entry to the Component Builder of the preferred mode of the present invention. The scroll down view of Window 826 is shown in FIG. 26 and discussed below. Window 826 has the normal functionality of similar windows within the common operating environment. Window 826 is generally arranged with the XML mapping elements positioned in the left pane 830. Sources occupy the center pane. Controls, Properties, and Actions are found in the right most pane.

Turning to the left pane 830, containing the XML mapping tree, Newspaper 836 is at the highest level. The second level contains article 838. At the third level are Author 840, Editor 842, Date 844, and Edition 846; all of which are attributes. The last three of which are optional. The later portion of the second level contains Headline 848, Byline 850, Lead 852, Body 854, and Notes (see also FIG. 26), all of which are elements. Column 858 contains an enablement "radio button" for each of the listed elements in the XML mapping tree.

The center pane contains sources. Shown is a table with a row and columns corresponding to the element tree for newspaper articles.

Controls, Properties, and Actions are shown in the right pane of the window. The main property selections are Name conversion 864, Table mapping 866, and Mapping type 868. The Element Properties are Item Type 860, Element Form 861, Mapping 862, and Value 863.

FIG. 26 is the scroll down view of Window 826 of FIG. 25. All previously indicated elements are as discussed above. Actions Menu 865 are clearly seen in this view.

Figure 27:
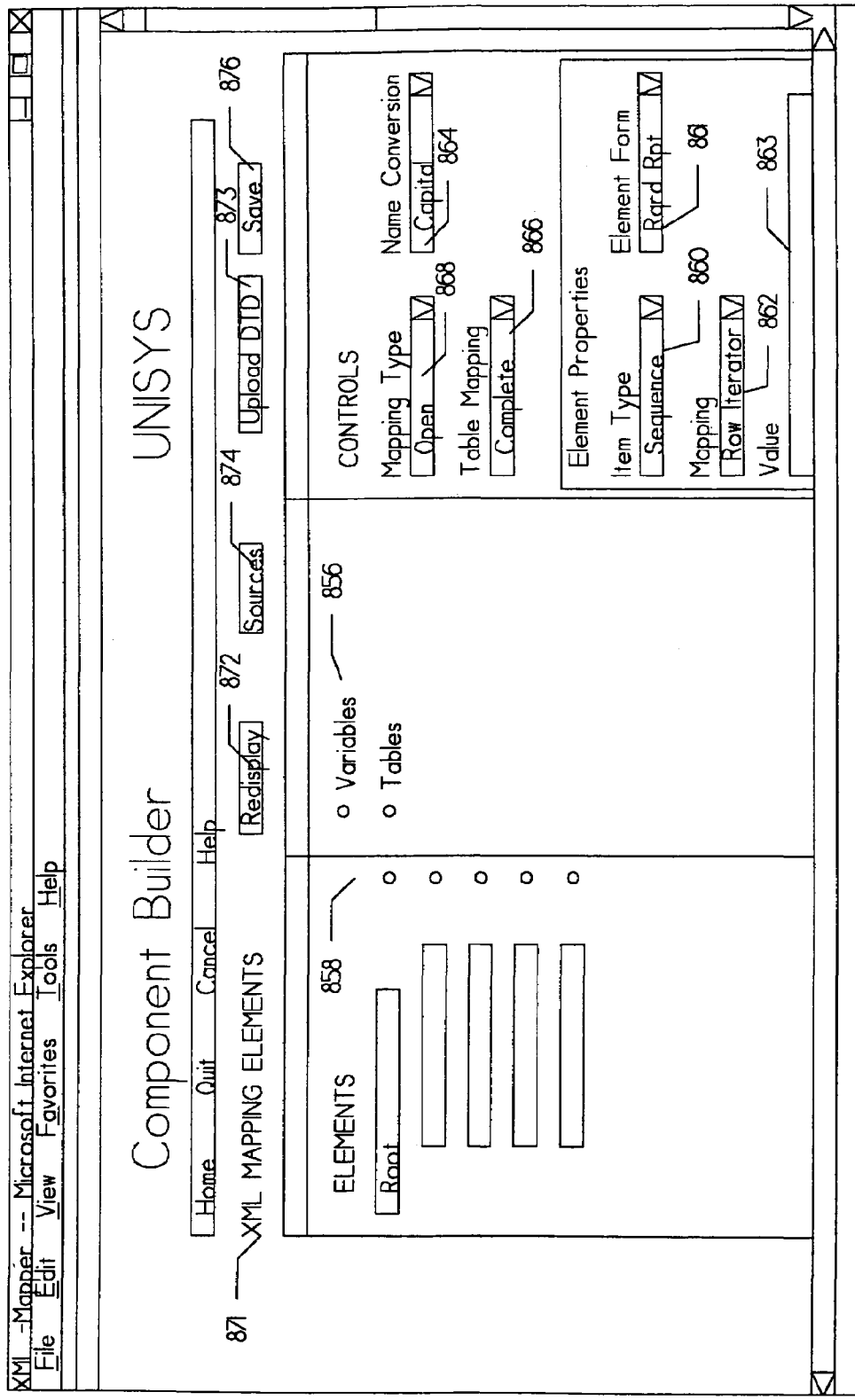
FIG. 27 is a view of the component builder window which provides for definition of XML mapping properties.

FIG. 27 is a view of window 870 of the component builder which provides for definition of mapping properties 880. The XML mapping tree is located in the left most pane. It is as explained above. The push button, Elements 896, has been added.

The right pane is used to define the mapping properties. Pull down menu 882 permits selection of sequence. Similarly, pull down menu 884 provides selection of element form. Pull down menu 886 permits selection of "mapped to". The source/destination is displayed at element 888.

Pull down menu 892 provides selection of DTD representation. XML representation is selected in pull down menu 894. Push button 898 activates "sources".

Additional functionality is provided by push button 900 which returns control to the home page. Push button 902 activates a display of the DTD. Push button 904 permits the user to save the current mapping.

Figure 28:
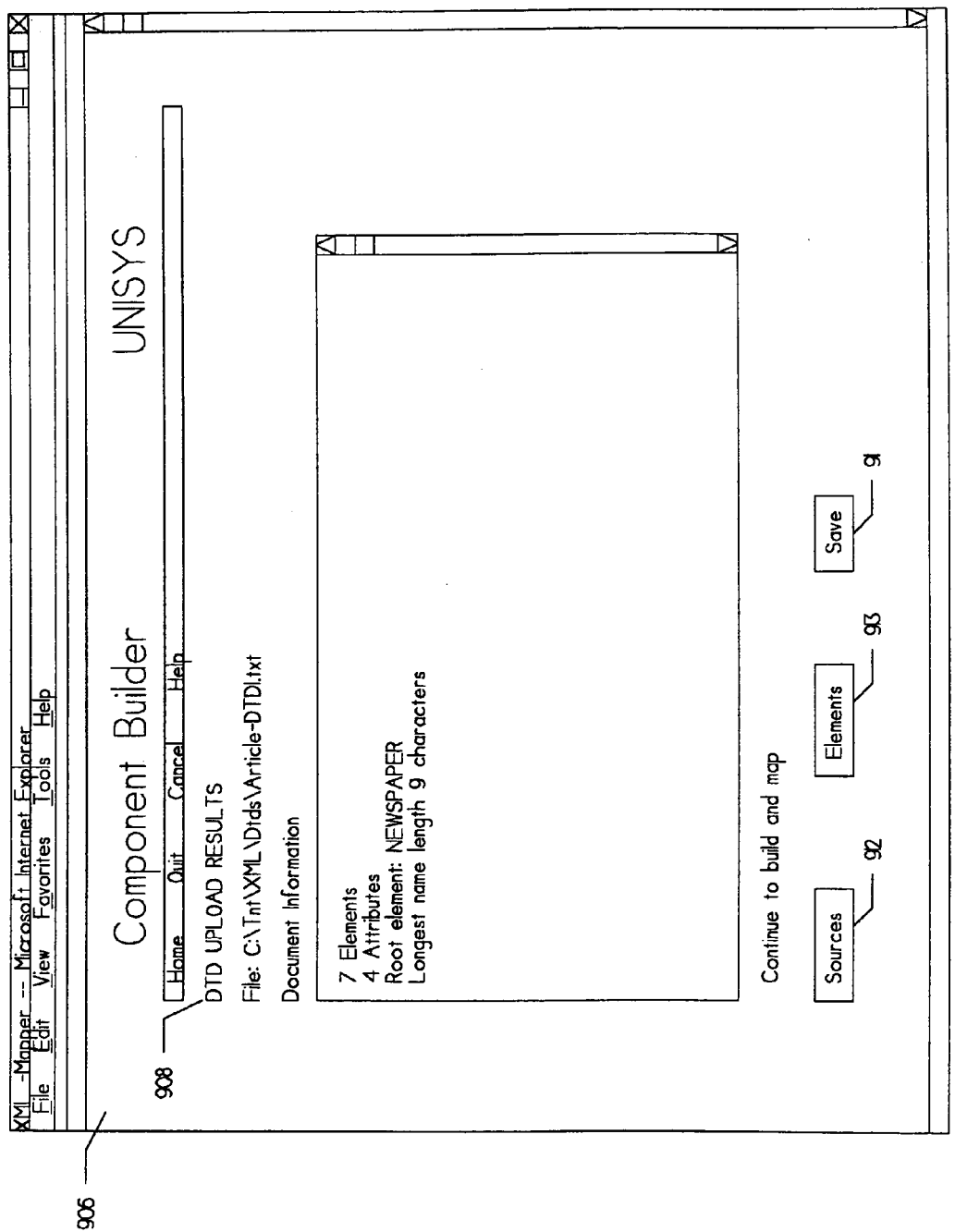
FIG. 28 is a view of the component builder window providing uploading of the DTD.

FIG. 28 is a view of window 906 of the Component Builder. It provides the function of DTD upload 908. Pull down menu 910 presents the pathways for the available DTD's. After selection, push button 912 causes the selected DTD to be retrieved.

FIG. 29 is an example 910 of an Input Definition Table (IDT). The IDT is basically a table of sequential text lines which identify the table, identify the conditions under which the table is to be used, and defines the translation to be made to a corresponding XML message sot that it will be converted into a form for use by the Cool ICE system.

The first line 912 of the table identifies the software version. It has the standard form containing the fields of:

1. Line identifier (i.e., "Version");
2. Activity identifier (i.e., "AC" which means "Access Constraints"); and
3. One or more data fields (i.e., version number "0.0").

Third line 914 defines the type checking to be done. Zero (0) indicates that no type checking is to be done. Second line 912 defines the truncation check. "0" indicates no truncation check is made.

The remaining lines of the IDT define in a textual way the structure and transformations to be done on the input XML document. The structural information consists of the name, entity type (element or attribute), level, and existence criteria (optional or required). The transformation information consists of a set of zero or more actions to be performed when the entity appears in the input XML document. Each action consists of the entity name, the action mnemonic, and any information needed for the action. The end of the table contains line 916 which completes the anticipated inventory update transaction to be performed by the corresponding XML message.

FIG. 30 is an example 918 of the Document Type Definition (i.e., DTD) corresponding to the IDT of FIG. 28. It functions as discussed above in greater detail.

FIG. 31 shows sample XML message 920 corresponding to the IDT of FIG. 28 and DTD of FIG. 29. This message contains modifications to be made to the inventory of the Roseville Store, retail shoe outlet. The data in this message becomes readily apparent to the human observer to include item numbers, shoe types, gender, size, color, unit cost, etc. for each of the shoes involved in the sample inventory transaction. Referring back to FIGS. 28 and 29, it can be seen that sample XML message 920 can be automatically decoded for processing as a Cool ICE service.

Figure 32:
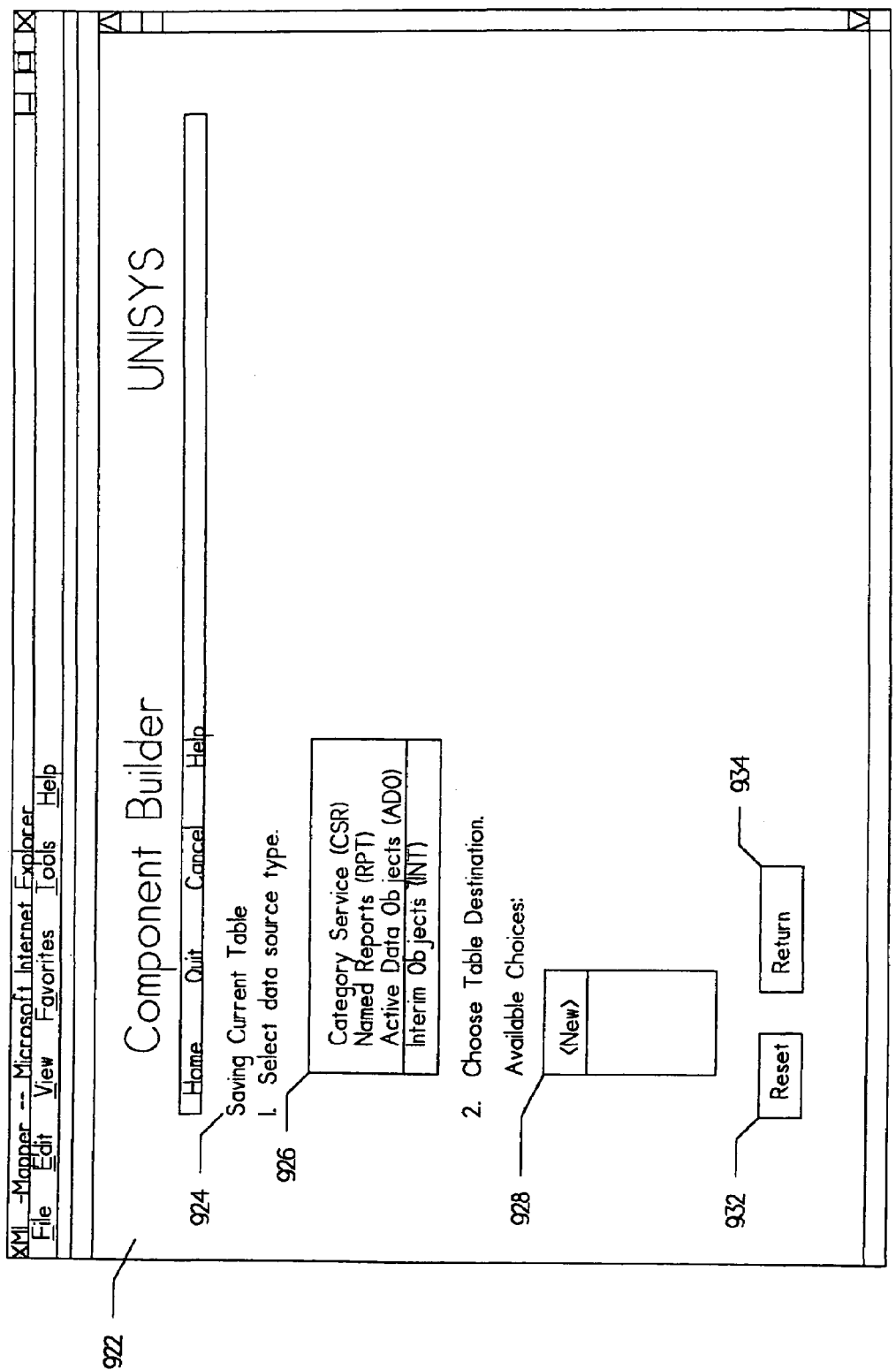
FIG. 32 shows the window which is utilized for saving the current table.

FIG. 32 shows the window 922 which is utilized to save the current table for future use. This window provides for saving of the XML mapping definition components as noted by heading 924. These components include the IDT, DTD, etc.

The data source type is selected from menu 926. If the table is to replace a currently existing table, it can be chosen from menu 928. The user's choice is shown in the text area 928. A user can also type in a new name in this area. Button 932 permits the user to reset the process, whereas button 934 provides the user the opportunity to return.

Having thus described the preferred embodiments of the present invention, those of skill in the art will be readily able to adapt the teachings found herein to yet other embodiments within the scope of the claims hereto attached.

We claim:

1. A data processing system including a legacy data base management system having a command language coupled to a publicly accessible digital data communication network comprising:
   a. a user terminal coupled to said legacy data base management system via said publicly accessible digital data communication network;
   b. a service request generated by said user terminal transferred to said legacy data base management system for honoring through execution of said command language by said legacy data base management system thereby producing a response and temporary computational data; and
   c. a facility responsively coupled to said legacy data base management system which saves said temporary computational data as a table for later use at a request by said user terminal at a location specified by said user terminal.

2. The data processing system according to claim 1 wherein said facility further comprises a repository.

3. The data processing system according to claim 2 wherein said service request further comprises a plurality of sequential text lines of said command language executable by said legacy data base management system.

4. The data processing system according to claim 3 wherein said service request is generated by said user terminal by completing a screen presented by said legacy data base management system.

5. The data processing system according to claim 4 wherein said screen includes a plurality of sources and a plurality of destinations for said table.

6. An apparatus comprising:
   a. a user terminal which generates a service request;
   b. a publicly accessible digital data communication network responsively coupled to said user terminal;
   c. a legacy data base management system having an internal format different from XML responsively coupled to said publicly accessible digital data communication network which receives said service request via said publicly accessible digital data communication network which honors said service request be executing an ordered sequence of command language statements producing temporary computational data and a result; and
   d. a facility responsively coupled to said legacy data base management system for storing said temporary computational data within said legacy data base management system as a table for future use at a user specified location in response to a selection by said user terminal.

7. The apparatus of claim 6 wherein said publicly accessible digital data communication system further comprises the Internet.

8. The apparatus of claim 7 wherein said facility further comprises a repository within said data base management system.

9. The apparatus of claim 8 wherein said future use further comprises honoring of a subsequent service request.

10. The apparatus of claim 8 wherein said future use further comprises completion of honoring said service request.

11. A method of Interfacing a user terminal to a legacy data base management system having an incompatible input protocol via a publicly accessible digital data communication network comprising:
   a. transferring a service request from said user terminal to said legacy data base management system via a publicly accessible digital data communication network;
   b. converting said service request to said incompatible input protocol;
   c. commencing the honoring of said service request by said legacy data base management system to produce an interim computational state; and
   d. storing said interim computational state for future use in response to a request from said user terminal at a location specified by said user terminal.

12. A method according to claim 11 wherein said storing step further comprises storing said interim computational state within a repository.

13. A method according to claim 12 wherein said storing step is initiated from a screen.

14. A method according to claim 13 wherein said screen provides for selection of destination.

15. A method according to claim 14 wherein said publicly accessible digital data communication network further comprises the Internet.

16. An apparatus comprising:
   a. generating means for generating a service request;
   b. transferring means responsively coupled to said generating means for transferring said service request via a publicly accessible digital data communication network;
   c. providing means responsively coupled to said transferring means for providing legacy data base management functions to honor said service request and producing temporary computational data;
   d. converting means responsively coupled to said providing means for converting said service request into a format compatible with said providing means; and
   e. storing means responsively coupled to said providing means for storing for future use said temporary computational data generated by said providing means in honoring said service request in response to a request from said generating means.

17. An apparatus according to claim 16 wherein said storing means further comprises a repository.

18. An apparatus according to claim 17 wherein said converting means further comprises defining means for defining a format of said service request.

19. An apparatus according to claim 18 wherein said transmitting means further comprises the Internet.

20. An apparatus according to claim 19 wherein said storing means stores said computational state for future use.

21. An apparatus for efficiently honoring a service request comprising:
   a. a user terminal which generates said service request in accordance with a first protocol;
   b. a publicly accessible digital data communication network responsively coupled to said user terminal;
   c. a legacy data base management system which honors said service request by executing a sequence of command language script in accordance with a second protocol responsively coupled to said user terminal via said publicly accessible digital data communication network which receives said service request via said publicly accessible digital data communication network;
   d. a converter responsively coupled to said legacy data base management system which converts said service request from said first protocol to said second protocol; and
   e. a facility responsively coupled to said legacy data base management system for storing the computational state of said legacy data base management system as a table for future use during execution of said sequence of command language script in response to a selection from said user terminal.

22. The apparatus of claim 21 wherein said facility further comprises a repository within said data base management system.

23. The apparatus of claim 22 wherein said publicly accessible digital data communication system further comprises the Internet.

24. The apparatus of claim 23 wherein said future use further comprises honoring of a subsequent service request.

25. The apparatus of claim 23 wherein said future use further comprises completion of honoring said service request.

* * * * *